US007504756B2

(12) United States Patent
Caprio et al.

(10) Patent No.: US 7,504,756 B2
(45) Date of Patent: Mar. 17, 2009

(54) HIGH STRENGTH INDUCTION MACHINE, ROTOR, ROTOR CAGE END RING AND BAR JOINT, ROTOR END RING, AND RELATED METHODS

(75) Inventors: Matthew T. Caprio, Austin, TX (US); Vasileios Lelos, Austin, TX (US); John Herbst, Austin, TX (US); Stephen Manifold, Austin, TX (US); Howard Jordon, Mentor, OH (US)

(73) Assignee: Board of Regents, The University of Texas System, Austin, TX (US)

( * ) Notice: Subject to any disclaimer, the term of this patent is extended or adjusted under 35 U.S.C. 154(b) by 473 days.

(21) Appl. No.: 11/338,936

(22) Filed: Jan. 25, 2006

(65) Prior Publication Data

US 2006/0273683 A1 Dec. 7, 2006

Related U.S. Application Data

(60) Provisional application No. 60/647,898, filed on Jan. 28, 2005.

(51) Int. Cl.
*H02K 17/00* (2006.01)
(52) U.S. Cl. ..................................................... 310/211
(58) Field of Classification Search .............. 310/211, 310/212, 166, 261
See application file for complete search history.

(56) References Cited

U.S. PATENT DOCUMENTS

| 1,433,622 | A |   | 10/1922 | Johnson et al. |       |
|-----------|---|---|---------|----------------|-------|
| 2,200,126 | A |   | 5/1940  | Smith          |       |
| 3,662,200 | A | * | 5/1972  | Rank et al. ................ | 310/211 |
| 3,683,493 | A |   | 8/1972  | Begovich       |       |
| 3,694,906 | A | * | 10/1972 | Rank et al. .................... | 29/598 |
| 4,064,410 | A |   | 12/1977 | Roach          |       |
| 4,249,098 | A |   | 2/1981  | Karlen et al.  |       |
| 4,281,234 | A | * | 7/1981  | Dohogne .................... | 219/635 |
| 5,283,941 | A |   | 2/1994  | Meyer et al.   |       |
| 5,398,404 | A |   | 3/1995  | Meyer et al.   |       |

(Continued)

OTHER PUBLICATIONS

J.D. Herbst, M.T. Caprio, R.F. Thelen, *Status of the Advanced Locomotive Propulsion System (ALPS) Project*, 2003 ASME International Mechanical Engineering Congress & Exposition (IMECE '03), Nov. 16-21, 2003, Washington D.C.

(Continued)

*Primary Examiner*—Gary F. Paumen
(74) *Attorney, Agent, or Firm*—Bracewell & Giuliani LLP

(57) ABSTRACT

A high strength induction machine, rotor, rotor cage end ring and bar joint, rotor end ring, and related methods are provided. An embodiment of an end ring and bar joint includes a main body adapted to substantially surround a rotor shaft when mounted thereto, a plurality of slots extending inwardly in a radial direction from outer peripheries of the main body, a thicker end ring section extending outwardly from a medial portion of the main body, being thicker than the outer peripheries of the main body, and also being adapted to substantially surround the rotor shaft, and a plurality of bosses extending axially and outwardly from outer peripheral portions in a direction opposite to the thicker end ring section and each adapted to receive an end portion of a rotor bar therein.

16 Claims, 22 Drawing Sheets

U.S. PATENT DOCUMENTS

| | | | |
|---|---|---|---|
| 5,719,457 | A | 2/1998 | Helfer |
| 5,729,885 | A * | 3/1998 | Carosa et al. ............... 29/598 |
| 5,736,707 | A | 4/1998 | Nied et al. |
| 5,758,095 | A | 5/1998 | Albaum |
| 5,933,136 | A | 8/1999 | Brown |
| 5,937,508 | A | 8/1999 | Shiga |
| 6,092,277 | A | 7/2000 | Beltowski et al. |
| 6,177,750 | B1 * | 1/2001 | Tompkin ................... 310/261 |
| 6,246,141 | B1 | 6/2001 | Bailey |
| 6,534,891 | B2 * | 3/2003 | Kliman et al. .............. 310/211 |
| 6,566,778 | B1 | 5/2003 | Hasegawa et al. |
| 6,587,829 | B1 | 7/2003 | Carmada |
| 2007/0062026 | A1 * | 3/2007 | Pizzichil ..................... 29/596 |

OTHER PUBLICATIONS

J.D. Herbst, M.T. Caprio, R.F. Thelen, *2 MW 130 kWh Flywheel Energy Storage System*, Electrical Energy Storage—Applications and Technology (EESAT2003), Oct. 27-29, 2003, San Francisco, CA.

R.F. Thelen, J.D. Herbst, M.T. Caprio, *A 2MW Flywheel for Hybrid Locomotive Power*, IEEE Semiannual Vehicular Technology Conference, Oct. 6-9, 2003, Orlando, FL.

R.F. Thelen, *Specification and Design of a 2MW, 250 Hz Motor Drive for FESS Service*, Proceedings of the Electricity Storage Association, Annual Meeting 2002, Milwaukee, WI, Oct. 9-11, 2002.

*Selection of Electrical Steels for Magnetic Cores*, Armco Electrical Steel Products, Butler, PA, 1985.

J.G. Cowie, *The Die-Cast Copper Motor Rotor is a Commercial Reality*, Update: Copper Motor Rotor, vol. 3, Issue 3, Jun. 2003, Copper Development Association Inc., New York, NY.

A.E. Fitzgerald, C. Kingsley, S.D. Umans, *Electric Machinery*, 5th Ed., p. 359, McGraw-Hill, 1990.

*Amzirc Technical Data*, American Metal Climax Inc., New York, NY, 1966.

M. Hodowanec, W. R. Finley, *Copper versus Aluminum Induction-Motor Rotors: Which Construction is Best?*, IEEE Industry Applications Magazine, Jul./Aug. 2002.

*Tech Briefs: Brazing Copper Beryllium*, Brush Wellman Inc., Cleveland, OH, 1985.

*Product Data Sheet: Solder Wire*, Indium Corporation of America, Utica, NY, 1997.

C. Kallmayer, H. Oppermann, G. Engelmann, E. Zakel, H. Reichl, *Self-Aligning Flip-Chip Assembly using Eutectic Gold/Tin Solder in Different Atmospheres*, IEEE/CPMT International Electronics Manufacturing Technology Symposium, Austin, TX, 1996.

F.M. Hosking, J.J. Stephens, J.A. Rejent, *Intermediate Temperature Joining of Dissimilar Metals*, AWS Welding Journal, Welding Research Supplement, Apr. 1999.

J. Penman, A. Stavro, *Broken Rotor Bars: Their Effect On The Transient Performance Of Induction Machines*, IEEE Proceedings: Electric Power Applications, v 143, n 6, Nov. 1996 p. 449-457.

C.H. Jun, A. Nicholas, *Analysis Of The Mechanical Stresses On A Squirrel Cage Induction Motor By The Finite Element Method*, IEEE Transaction on Magnetics, v 35, n 3 pt 1, May 1999, p. 1282-1285.

W.R. Finley, M.M. Hodowanec, *Selection Of Best Induction Motor Rotor Construction Methods*, IEEE Conference Record of Annual Pulp and Paper Industry Technical Conference, 2001, p. 48-58.

W.T. Thompson, M. Fenger, *Industrial Application Of Current Signature Analysis To Diagnose Faults In 3-Phase Squirrel Cage Induction Motors*, IEEE Conference Record of Annual Pulp and Paper Industry Technical Conference, 2000, p. 205-211.

N. El Kasabgy, A.R. Eastham, G.E. Dawson, *Detection And Effects Of Broken Bars In Cage Rotor Magnetic Field Space-Vector Organization*, IEEE Workshop on Electromagnetic Field Computation Proceedings 1987, p. G22-G28.

B. Mirafzal, N. Demerdash, *Induction Machine Broken-Bar Fault Diagnosis Using The Rotor Magnetic Field Space-Vector Orientation*, IEEE Transaction on Industry Applications, v 40, n 2, Mar./Apr. 2004, p. 534-542.

International Search Report dated Apr. 11, 2008 (2 pages).

\* cited by examiner

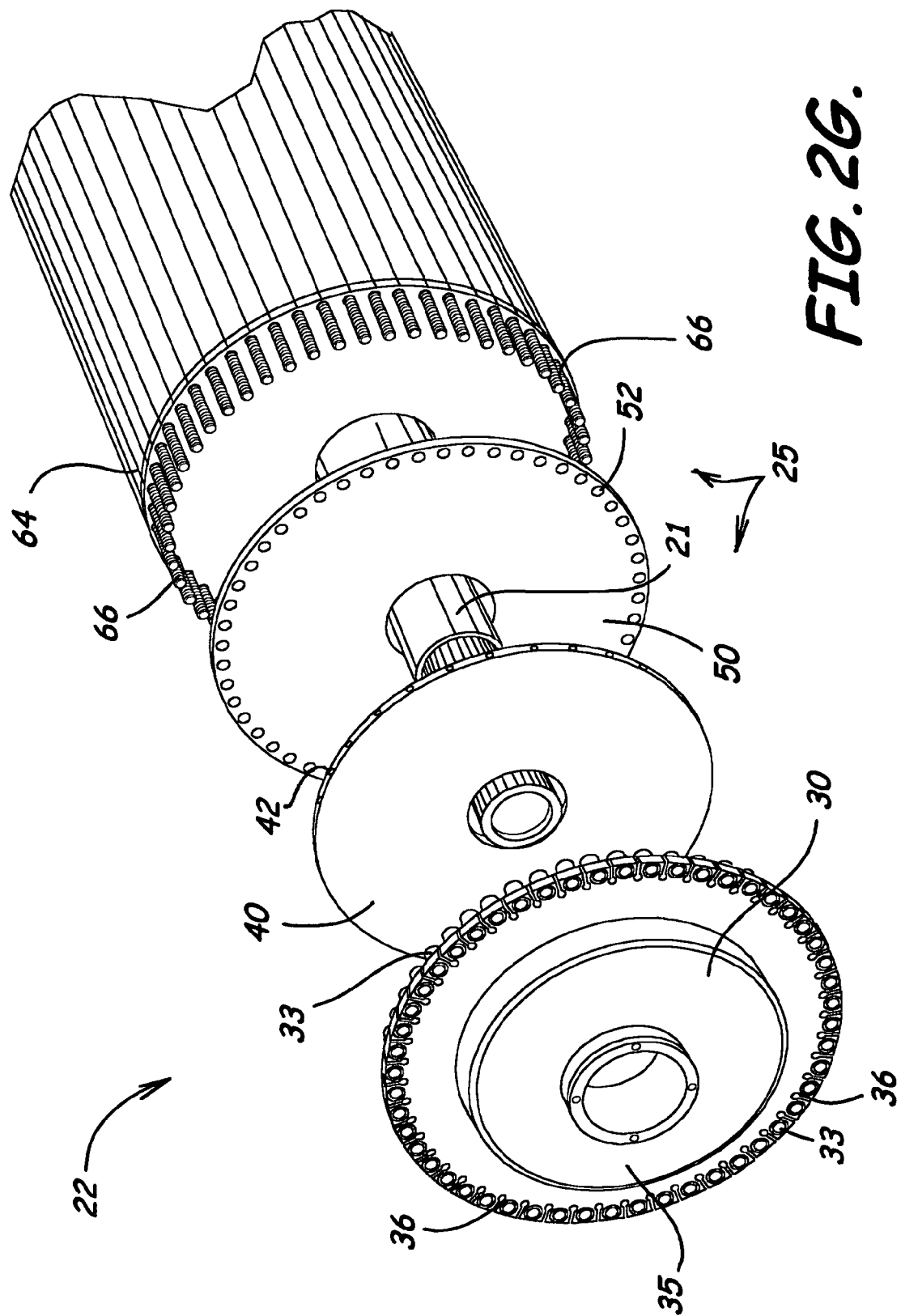

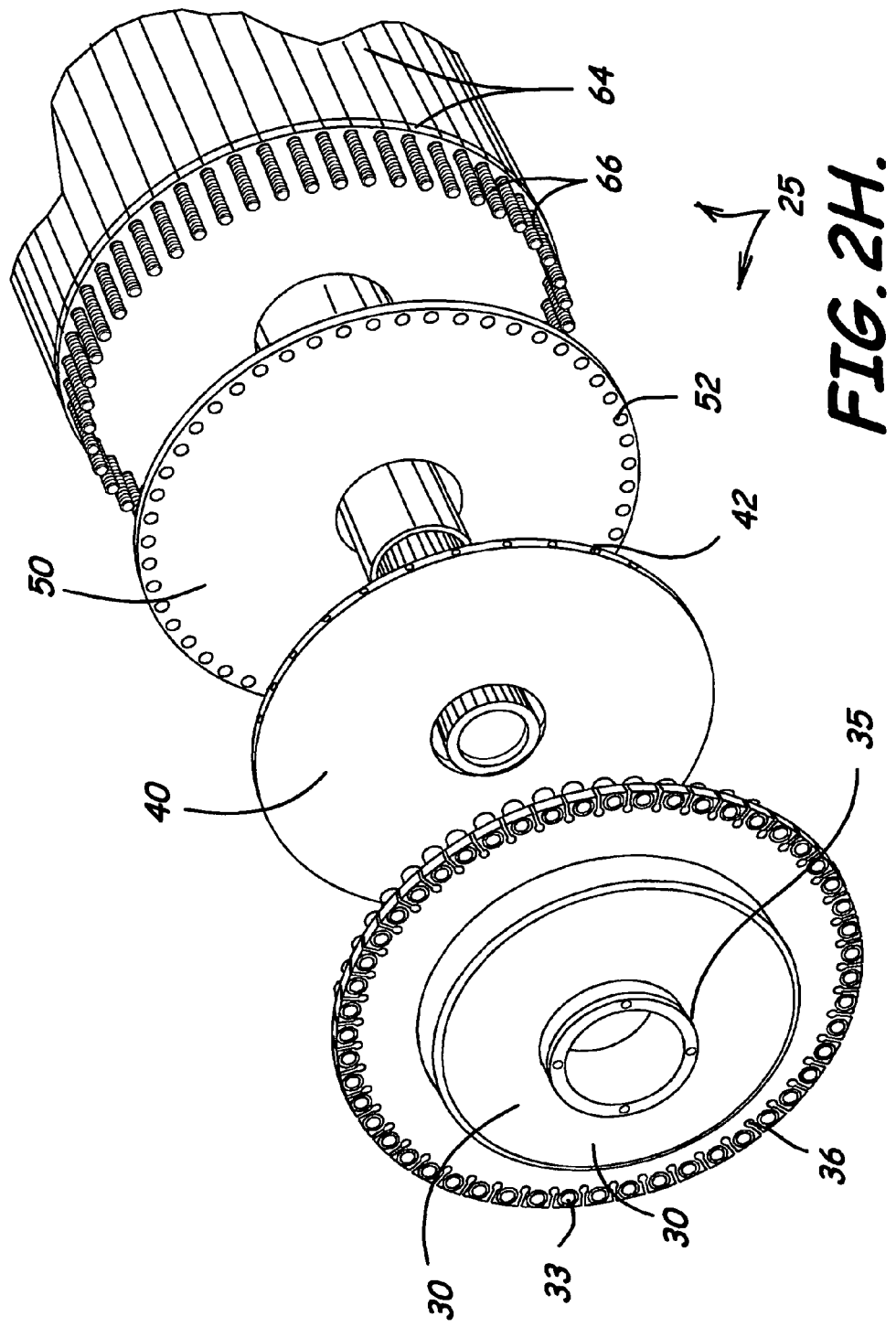

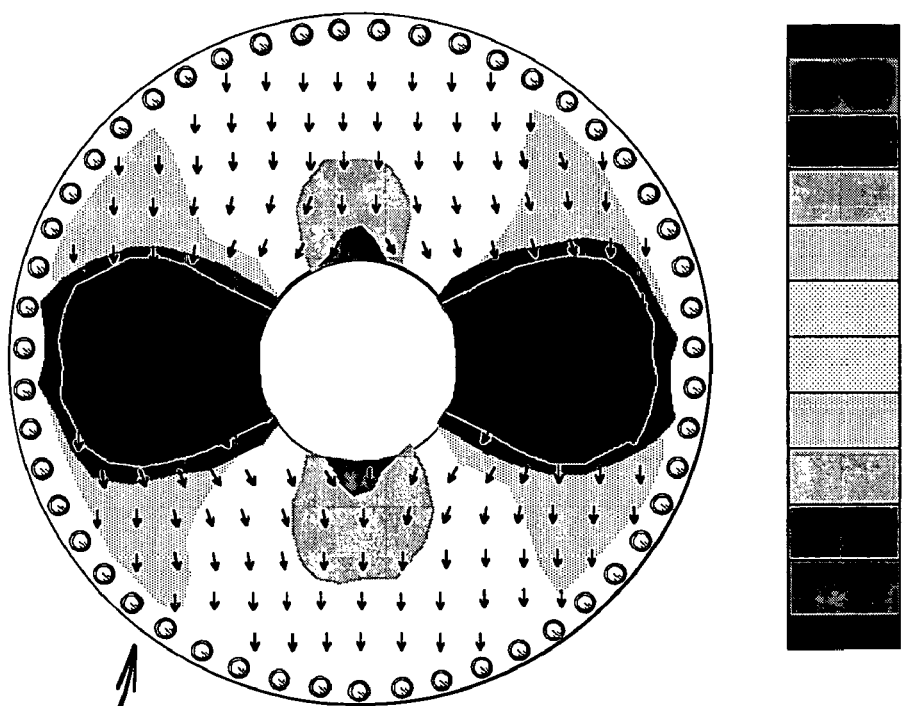
FIG.3A.
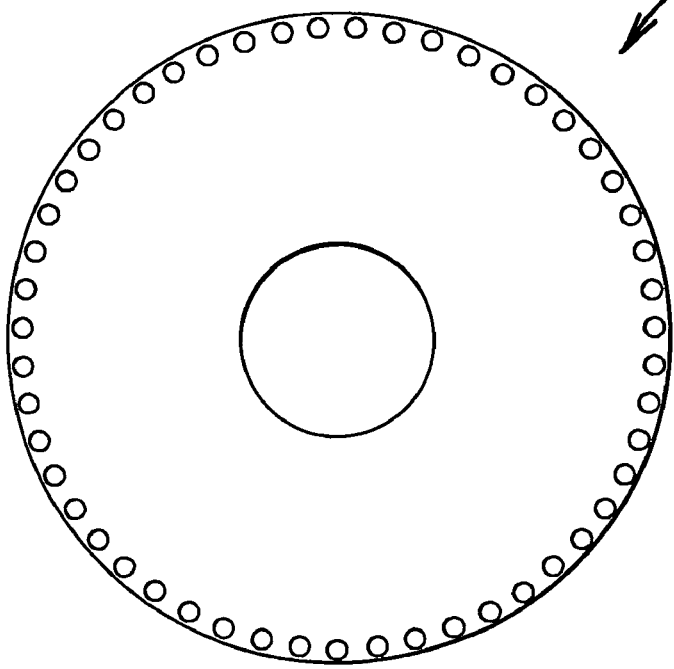
FIG.3B.
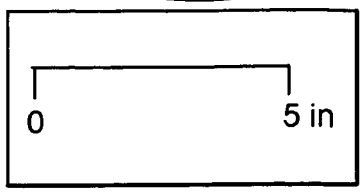

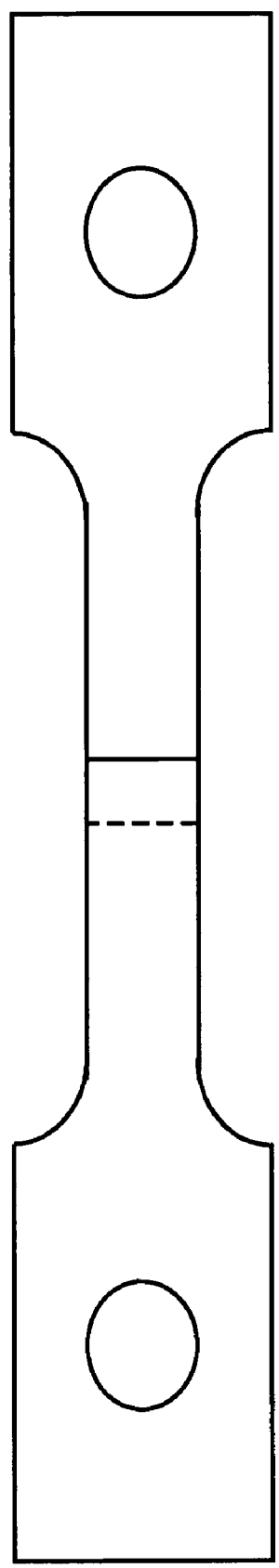
FIG. 13
FIG. 14.

HIGH STRENGTH INDUCTION MACHINE, ROTOR, ROTOR CAGE END RING AND BAR JOINT, ROTOR END RING, AND RELATED METHODS

RELATED APPLICATIONS

This application is related to and claims priority and benefit of U.S. Provisional Patent Application Ser. No.: 60/647,898, filed Jan. 28, 2005, titled High Strength Induction Machine, Rotor, Rotor Cage End Ring and Bar Joint, Rotor End Ring, and Related Methods, by inventors Matthew Caprio, Vasileios Lelos, John Herbst, Stephen Manifold, and Howard Jordan, and which is incorporated herein by reference in its entirety.

GOVERNMENT INTEREST

Reference to Government Funding

The United States Government has rights in this invention pursuant to Contract No. DTRF53-99-H-00006 between the Federal Railroad Administration and the University of Texas at Austin.

BACKGROUND OF THE INVENTION

1. Field of the Invention

The present invention relates to induction machines and, more particularly, to end ring and bar joints associated with such motors and generators and related methods.

2. Description of Related Art

Over the years various induction machines, such as motors and generators, have been developed. Some of these machines conventionally include a stator that produces a rotating magnetic field and a rotor that rotates. Such stators and rotors are often coaxial cylinders. The rotor often includes a rotor shaft and a core having a plurality of laminated steel punchings or laminations substantially surrounding portions of the rotor shaft and in a substantially stacked arrangement. The rotor also has a plurality of conductor or rotor bars each spaced-apart and extending through (or otherwise associated with) the plurality of laminations. The rotor bars also often extend substantially parallel to an axis of the rotor shaft. The rotor additional can include a pair of end rings each positioned on an opposing end of the stacked plurality of laminations and connected to and supported by the rotor bars.

Examples of such induction motors and rotors can be seen in U.S. Pat. No. 6,566,778 by Hasegawa et al. titled "Cage-type Induction Motor For High Rotational Speeds," U.S. Pat. No. 6,246,141 by Bailey titled "High Torque Reduced Starting Current Electric Motor," U.S. Pat. No. 6,092,277 by Beltowski et al. titled "Rotor Bar Swaging Process," U.S. Pat. No. 4,281,234 by Dohgne titled "Method Of Induction Annealing Squirrel Cage Rotors," U.S. Pat. No. 4,249,098 by Karlen et al. titled "Squirrel-Cage Rotor Structure For An Asynchronous Electrical Motor," U.S. Pat. No. 4,064,410 by Roach titled "Squirrel Cage Rotor And Method Of Making Same," U.S. Pat. No. 2,200,126 by Smith titled "Damper Bar," and U.S. Pat. No. 1,433,622 by Johnson et al. titled "Brazed Rotor Construction."

Although many rotors of these induction machines have a somewhat simple and yet robust construction, as understood by those skilled in the art, for a high speed, high power density application, centrifugal and thermal stresses are non-trivial and require rigorous design of each of these major rotor components. For example, thermally induced stresses add further complexity to end ring design, and the high power density of certain machine implies that the operating temperatures of the rotor are relatively high, even with forced air-cooling. The temperature growth of the rotor, constructed of dissimilar metals with large differences in thermal expansion coefficients, results in high stresses at the end ring. In addition, differential growth can occur at high-speed and/or high-temperature conditions between the rotor core and end ring components due to differing density and coefficients of thermal expansion, resulting in a high shear load on the rotor bars and bar joints.

Accordingly, there is still a need for high strength induction machines, rotors, and end rings that enhance operation at high speeds and at high power density. There is also a need for enhanced induction machines, rotors, end rings, and rotor bar connections that can withstand high stress and high temperature conditions.

SUMMARY OF THE INVENTION

In view of the foregoing, embodiments of an apparatus, such as an induction machine, rotor, an end ring and bar joint, an end ring and related methods according to the present invention beneficially provide an increased mechanical strength connection that can withstand higher rotor speeds and higher rotor temperature operation to thereby enhance power density and reliability of induction machines. The enhanced strength of embodiments of a rotor end ring and bar joint, for example, increases reliability of machines in critical applications and significantly increases the design speed of a rotor to allow for higher speed, higher temperature, and consequentially higher power operation. Applications for embodiments of a high strength end ring and bar joint, for example, include direct drive flywheel motor generators, hybrid vehicle starter/generators, traction motors, pump and compressor drives, servo motors, mobile power generators, and other power dense, high speed, high-temperature, or high reliability induction motor or generator applications.

Embodiments of a high strength induction machine and a rotor cage end ring and bar joint according to the present invention enable motors and generators to operate at substantially higher speeds and/or higher temperatures by providing a much more robust mechanical and electrical connection at an interface. Higher speed and temperature operation also allows for significant improvements in machine mass and power density. These, for example, can be two critical design factors in advanced mobile applications including hybrid electric vehicles, aerospace power systems, and defense equipment.

More specifically, an embodiment of an apparatus, such as an induction machine, according to the present invention includes a stator having a stator frame, a stator core positioned in the stator frame, and a stator winding positioned in the stator frame. The apparatus also includes a rotor associated with the stator and including a rotor shaft and a rotor cage assembly substantially surrounding at least portions of the rotor shaft. The rotor cage assembly includes a rotor core having a plurality of laminations defining a stack, a plurality of rotor bars associated with the plurality of laminations, and a pair of end ring and bar joints each positioned along one of respective opposing ends of the stack. Each of the pair of end ring and bar joints includes a pair of an end lamination plates positioned along opposing ends of the stack and associated with the plurality of rotor bars, a pair of end rings each positioned adjacent one of the pair of end lamination plates and connected to each of the plurality of rotor bars, and a pair of spacer plates each positioned between one of the pair of end lamination plates and one of the pair of end rings. Each of the pair of end rings has a plurality of slots extending inwardly in a radial direction from outer peripheries of the end ring toward a medial portion of the end ring and a plurality of bosses extending axially and outwardly from outer peripheral portions toward one of the pair of end lamination plates. The medial portion of each of the pair of end rings includes a thicker end ring section extending outwardly and axially away from the spacer plate and being thicker than the outer peripheral portions.

An embodiment of a rotor according to the present invention, for example, includes a rotor shaft and a rotor cage assembly substantially surrounding at least portions of the rotor shaft. The rotor cage assembly includes a rotor core having a plurality of laminations defining a stack, a plurality of rotor bars associated with the plurality of laminations, a pair of an end lamination plates positioned along opposing ends of the stack and associated with the plurality of rotor bars, a pair of end rings each positioned adjacent one of the pair of end lamination plates and connected to each of the plurality of rotor bars, and a pair of spacer plates each positioned between one of the pair of end lamination plates and one of the pair of end rings. Each of the pair of end rings has a plurality of slots extending inwardly in a radial direction from outer peripheries of the end ring toward a medial portion of the end ring and a plurality of bosses extending axially and outwardly from outer peripheral portions toward one of the pair of end lamination plates. The medial portion of each of the pair of end rings includes a thicker end ring section extending outwardly and axially away from the spacer plate and being thicker than the outer peripheral portions. Each of the combination of one of the pair of end lamination plates, one of the pair of spacer plates, and one of the pair of end rings having the plurality of bosses defines an embodiment of an end ring and bar joint of the rotor according to the present invention.

An embodiment of an end ring for a rotor of an induction machine according to the present invention includes a main body adapted to substantially surround a rotor shaft when mounted thereto, a plurality of slots extending inwardly in a radial direction from outer peripheries of the main body, a thicker end ring section extending outwardly from a medial portion of the main body, being thicker than the outer peripheries of the main body, and also being adapted to substantially surround the rotor shaft, and a plurality of bosses extending axially and outwardly from outer peripheral portions in a direction opposite to the thicker end ring section and each adapted to receive an end portion of a rotor bar therein.

Embodiments of an end ring and bar joint according to the present invention, for example, significantly reduce stress concentrations at the bar to end ring brazed or soldered joint, allowing higher speed and/or high-temperature operation. When combined with proper spacing between the rotor core and end ring, such as with the spacer plate, the end ring boss feature provides a region over which the radial growth difference can be converted from a shear load to a bending load, and blends the stress in the bar and brazed or soldered joint. Converting the shear loading to more benign bending dramatically reduces the peak stresses at the bar and joint, which otherwise can be a common point of failure due to yield.

Embodiments of an end ring and bar joint also isolate the brazed or soldered bar joint region from the high hoop stresses that accompany high-speed and/or high-temperature operation. Isolating the joint from the hoop stress dramatically reduces the load carried by the brazing or soldering filler metal, which otherwise can be a design limitation under extreme conditions, as the filler metal typically possesses a lower strength than the parent materials.

A nonuniform end ring cross section allows embodiments of an end ring to be self supported during high-speed operation, maintaining its centered location on the rotor shaft, instead of being supported by the rotor bars. This feature, for example, reduces stresses on the rotor bars to acceptable levels for high-speed operation. A high strength induction machine rotor cage end ring and bar joint of embodiments of the present invention can dramatically increase the output power of a motor of a given size envelope, or increase the reliability of induction motors in conventional applications.

Embodiments of related methods of the present invention, for example, can provide a method of assembling a rotor such as for an induction machine. The method includes positioning a plurality of substantially cylindrical shaped rotor bars through a plurality of laminations which define a stack and to substantially surround a rotor shaft so that end portions of each of the plurality of rotor bars extends outwardly from opposing ends of the stack, positioning an end lamination plate having a plurality of annular-shaped openings extending along outer peripheries thereof onto each of the end portions of the plurality of rotor bars, positioning an end ring including a plurality of bosses extending outwardly toward end lamination plate along opposing ends of the stack so that each of the plurality of bosses receives an end portion of one of the plurality of rotor bars, and positioning a spacer plate between each of the end lamination plate and the end ring positioned along the opposing ends of the stack. Each of the combination of one of the pair of end lamination plates, one of the pair of spacer plates, and one of the pair of end rings having the plurality of bosses defines an end ring and bar joint of the rotor.

Embodiments of related methods also provide a method of operating a rotor of a machine. The method includes positioning at least one end ring and bar joint having an end ring on an end of a plurality of laminations defining a stack of a rotor core of a rotor so that the end ring connected to a plurality of rotor bars is substantially supported by a rotor shaft extending through the end ring when the rotor core rotates rather than the plurality of rotor bars and driving the rotor core at a relatively high speed.

Beneficially, a high strength induction machine rotor cage end ring and bar joint of embodiments of the present invention reduces stress at the common failure point of electric motors, allowing significant advancements in operating speed and power. High-speed motors produce more power than low speed motors at equivalent torque levels and can also result in the elimination of costly, complex parts such as gear transmissions. Compact, lightweight, high-speed motor designs, for example, meet the needs of advanced mobile applications, can enhance system efficiency, and can extend the capabilities of ground vehicles, remote power systems, and aerospace and defense equipment.

BRIEF DESCRIPTION OF THE DRAWINGS

Some of the features and benefits of the present invention having been stated, others will become apparent as the description proceeds when taken in conjunction with the accompanying drawings, in which:

FIG. 2G is an exploded view of an end ring, a spacer plate, and an end lamination plate mounted to laminations of a rotor according to an embodiment of the present invention;

FIG. 2H is an exploded view of an end ring, a spacer plate, and an end lamination plate mounted to laminations of a rotor according to an embodiment of the present invention;

FIG. 3A is plot of Joule heating distribution with an end ring according to an embodiment of the present invention;

FIG. 3B is a perspective view of an end lamination plate according to an embodiment of the present invention;

FIG. 13 is a plan view of a shear test specimen used to evaluate the performance of solder joint filler materials, fluxes, and processes according to embodiments of the present invention; and FIG. 14 is a side elevational view of a shear test specimen used to evaluate the performance of the solder filler materials, fluxes, and processes according to embodiments of the present invention.

DETAILED DESCRIPTION

The present invention now will be described more fully hereinafter with reference to the accompanying drawings in which embodiments of the invention are shown. This invention, however, may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
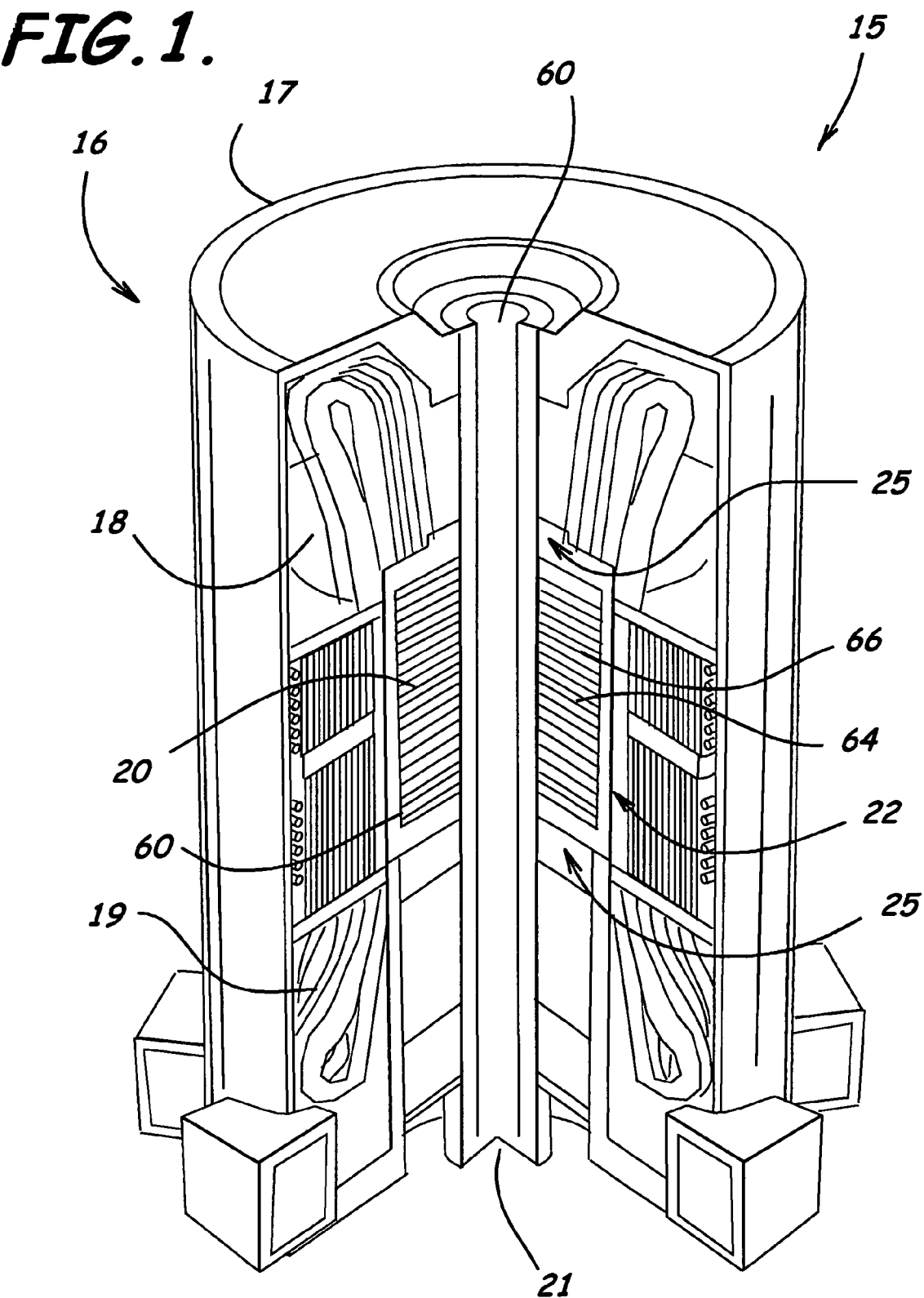
FIG. 1 is a perspective view, with portions broken away for clarity, of a motor having an end ring and bar joint according to an embodiment of the present invention.
Figure 11:
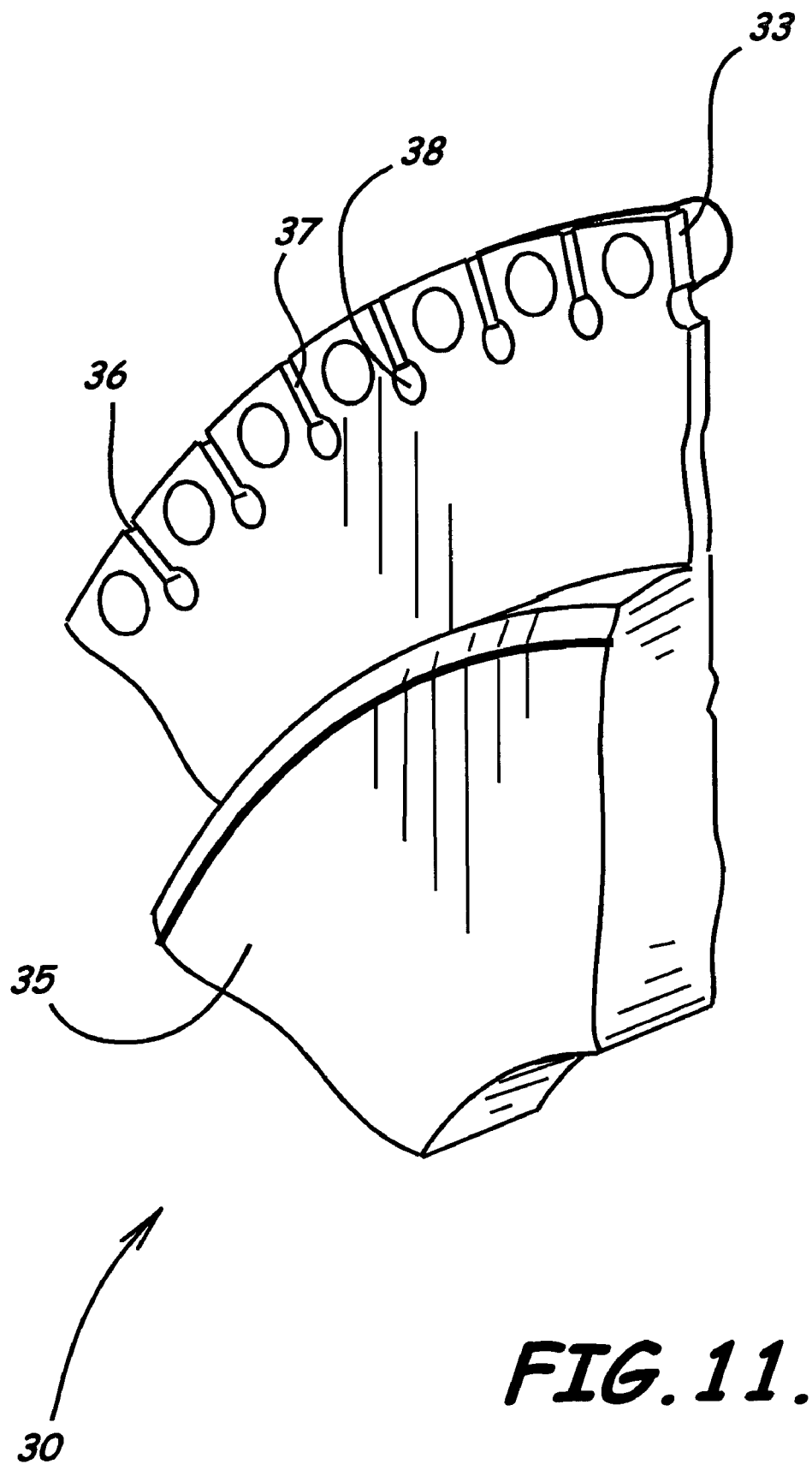
FIG. 11 is a fragmentary front view of an end ring according to an embodiment of the present invention.

FIGS. 1-14 illustrate embodiments of an apparatus 15 such as a high strength induction machine, a rotor 20 for an induction machine, an end ring and bar joint 25 and related methods according to the present invention. As will be understood by those skilled in art, an embodiment of an apparatus 15, for example such as shown in FIGS. 1-2J, includes a stator 16 having a stator frame 17, a stator core 18 positioned in or otherwise associated with the stator frame 17, such as including a stator housing and end bells, and air cooling inlet ducts, a stator oil cooling jacket, an air cooling exhaust duct, and a stator winding 19, e.g., formed coil stator windings, positioned in the stator frame 17 (see FIG. 11). An embodiment of a rotor 20 associated with the stator 16 includes a rotor shaft 21 and a rotor cage assembly 22 substantially surrounding at least portions of the rotor shaft 21. The rotor 20 also can have a shaft coupling to a flywheel, shaft seals, radial roller bearings, thrust and radial duplex ball bearings, bearing lubrication sump, and an oil squeeze film vibration damper, associated with the rotor shaft 21 as illustrated in FIG. 1 and as understood by those skilled in the art. The rotor cage assembly 22 includes a rotor core 60 having a plurality of laminations 64, e.g., formed of 4130 Alloy Steel, defining a stack, a plurality of rotor bars 66 associated with the plurality of laminations 64, and a pair of end rings and bar joints 25 each positioned along one of respective opposing ends of the stack.

Each of the pair of end ring and bar joints 25, according to an embodiment of the present invention, includes a pair of an end lamination plates 50 positioned along opposing ends of the stack and associated with the plurality of rotor bars 66, a pair of end rings 30 each positioned adjacent one of the pair of end lamination plates 50 and connected to each of the plurality of rotor bars 66, and a pair of spacer plates 40 each positioned between one of the pair of end lamination plates 50 and one of the pair of end rings 30. Each of the spacer plates 40, for example, can include one or more balance weight hole extending inwardly from outer peripheries of the spacer plate 40.

Each of the pair of end rings 30 has a plurality of slots 36 or cuts for stress relief extending inwardly in a radial direction from outer peripheries of the end ring toward a medial portion of the end ring 30 and a plurality of end ring bosses 33 extending axially and outwardly from outer peripheral portions toward one of the pair of end lamination plates. The medial portion of each of the pair of end rings 30 includes a thicker end ring section 35 extending outwardly and axially away from the spacer plate 40 and being thicker than the outer peripheral portions. Each of the pair of end lamination plates 50 can have a plurality of annular-shaped openings 52 extending along outer peripheries of the end lamination plate 50. Each of the plurality of annular-shaped openings 52 can have end portions of one of the plurality of stator bars 66 extending there through to coaxially align with one of the plurality of bosses 33 associated with one of the pair of end rings 30. Each of the combination of one of the pair of end lamination plates 50, one of the pair of spacer plates 40, and one of the pair of end rings 30 having the plurality of bosses 33, for example, can define an embodiment of an end ring and bar joint 25 of a rotor 20 according to the present invention.

For laminations in a rotor core, for example, conventionally, low coercivity, magnetically "soft," non-oriented silicon electrical steel grades such as the AISI M-15 through M-47 series are often employed. These steel grades are typically chosen due to their low hysteresis loss characteristics incidental to flux cycling of AC machines. Although their magnetic performance is attractive, the mechanical properties of these steels, however, are inadequate for some high-speed applications. For example, the published ultimate tensile strength of M-19 steel is 73 ksi, whereas some applications require over 110 ksi plus correctional margin.

In order to meet the mechanical strength requirements resulting from the tip speed in some applications, high-strength aircraft grade AISI 4130 alloy steel, for example, can be used for the laminations 64. Tests showed that the heat-treated, quenched, and tempered laminations achieved a yield strength of 180 ksi, while retaining satisfactory toughness. Although there is a compromise in hysteresis losses as the alloy steel has higher coercivity than the "electrical" steels, the increased core losses can be managed, for example, through effective cooling. For some applications, for example, 29-gauge (0.014 in thick) laminated sheets laser cut and coated with C5 surface insulation can be used to significantly reduce eddy current losses when compared to solid cores (see FIGS. 3A-3B).

An embodiment of the rotor core 60, for example, was designed to be assembled onto the rotor shaft 21 with an interference fit. The interference fit design allows for positive contact between the rotor 20 and the shaft 21 throughout the operating speed and temperature range, ensuring stable balance behavior. In addition to maintaining radial contact, sufficient net radial interface pressure should remain in order to transmit torque, with a significant factor of buffer for peak transient torques and overspeed.

The analysis of the core interference fit was performed using an axis-symmetric finite element model in Abaqus. The value of the radial interference was optimized for each component through iteration to provide adequate radial contact pressure to transmit torque under full load, hot conditions, without yielding the material in the static cold case. As the torque transmissibility through the interface is dependent on an uncertain coefficient of friction, substantial buffering factors can be imposed.

The aggressive level of interference fit selected through the analysis to maintain piloting at full speed is achievable with respect to maximum stresses, but nevertheless presents implementation complexities. When performing fits of this degree, large temperature differential thermal fits are required to install the heated core 60 onto the chilled shaft. Further, when using laminated materials, there is a risk of conical buckling of the core 60 once full interference pressure is achieved during the cool down phase of the thermal assembly.

In general, conical buckling can relax the preload of an interference fit, resulting in excessive rotor growth and axial shifting of the core causing balance problems and insulation faults in wound machines. Although not often reported in the literature, failure of high interference fit laminated rotor core assemblies through conical buckling can occur if not addressed.

Figure 5:
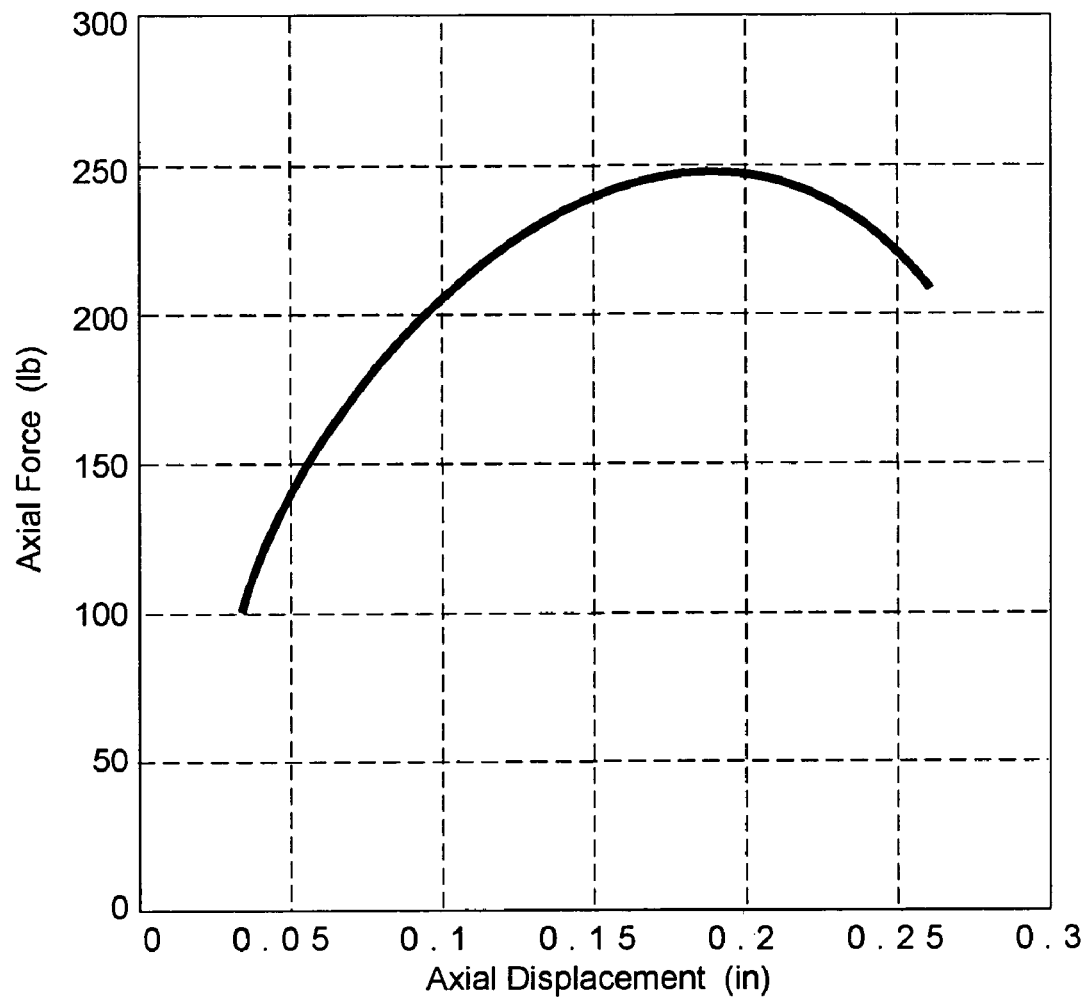
FIG. 5 is a graph of a single lamination buckling force versus axial displacement according to an embodiment of the present invention.
Figure 6:
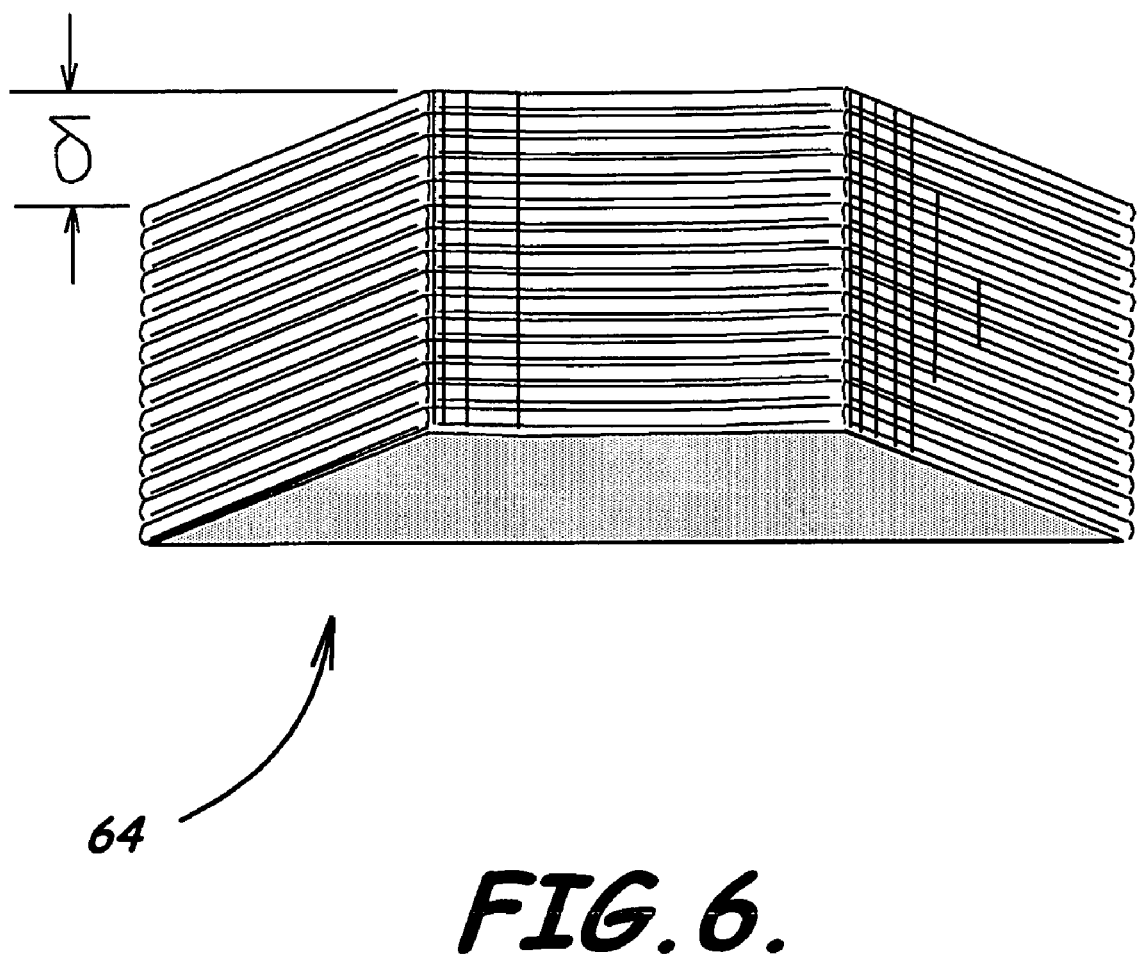
FIG. 6 is a perspective view of an axially buckled stack.
Figure 7:
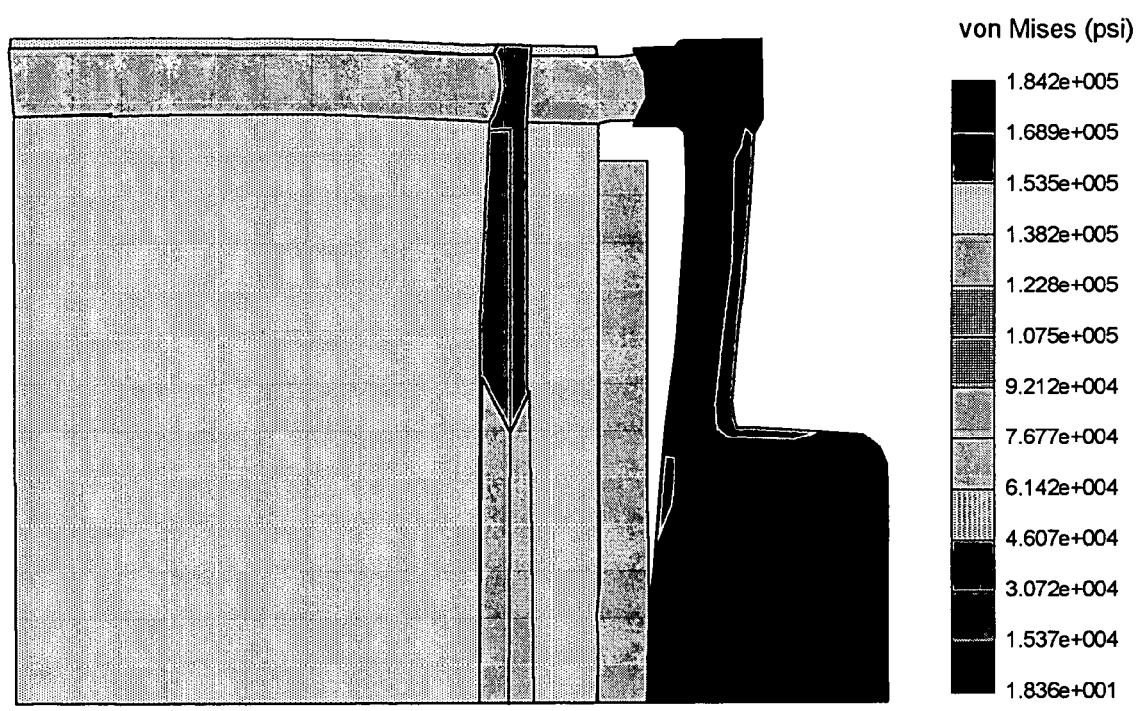
FIG. 7 is a deformed plot of Von Mises stresses from a three-dimensional finite element analysis for a particular operating speed and temperature distribution according to an embodiment of the present invention.

For a rotor 20 of embodiments of the present invention, for example, a methodology was devised to predict and prevent conical buckling of the core 60 through structural design. This approach depends on the axial deflection stiffness of specifically designed features of the rotor structure to contain the buckling motion. The buckling prevention analysis includes approximating the force-deflection characteristics of individual buckled laminations, and applying those forces to a finite element model of the structure to quantify the resulting deflection. A buckling force-displacement curve was generated based on closed form predictions for a single lamination, and is shown in FIG. 5. As the predicted axial forces generated by the buckling lamination increase to a peak value with increasing displacement and then roll off, a peak buckling force can be estimated, and its respective deflection level is defined as the "critical buckling deflection." The peak load is then applied to the structural model, and the resulting deflection is measured. The analysis criterion assumes that if the axial displacement of the rotor structure is equal to or greater than the critical buckling deflection, the core 60 will conically buckle (see FIG. 6). If, however, the resulting displacement is substantially less than the critical buckling deflection, the assembly is presumed to be structurally stable, with only negligible amount of conical deformation of the core during assembly.

For an embodiment of the rotor 20, the bolstering features incorporated into the rotor structure to prevent buckling include the end lamination plate 50, the balance ring spacer plate 40, the thick section 35 inner diameter of the end ring 30, and the clamping nuts 32. Buckling analysis showed that the assembly deflection due to peak buckling loads is only a small fraction of the critical buckling deflection, indicating that the design is stable against conical buckling. In addition to this integral structure, a stiff core clamping fixture, as will be understood by those skilled in the art, can be used during the assembly and removed after the core cools to room temperature. This design and analysis approach to preventing conical buckling of high interference laminated rotor cores 60 was successfully demonstrated with the recent fit of the core 60 of another machine 15, without buckling.

As will be understood by those skilled in the art, squirrel cage induction rotors can be manufactured in two ways: cast or "fabricated". Cast rotors are conventionally built with integral bars and end rings, formed directly in the lamination stack, with shot-poured aluminum. The cast design is economical for mass production, but as will be shown herein, the aluminum materials can be insufficient to handle the spin stresses for the end ring 30 in this application. It is believed that rotors can be successfully cast with copper, for example, for higher efficiency.

A fabricated rotor cage assembly 22 is therefore the preferred option, in embodiments of the present invention, for many high-speed applications given the strength levels required from the end ring and bar materials. With this fabrication approach, bars 66 are individually machined, inserted into the core holes, and joined to the end rings 30.

It is common for motors operating from fixed frequency line voltage to have rectangular section deep bars in order to achieve good starting characteristics at zero speed. As some high-speed applications are driven by a variable frequency power converter with vector control, high torque is available throughout the speed range without the need for non-uniform cross section bars. This fact allows the design to incorporate round cross section rotor bars 66 which are easier to manufacture, assemble, and provide reduced contact stress on the core lamination teeth.

Figure 8A:
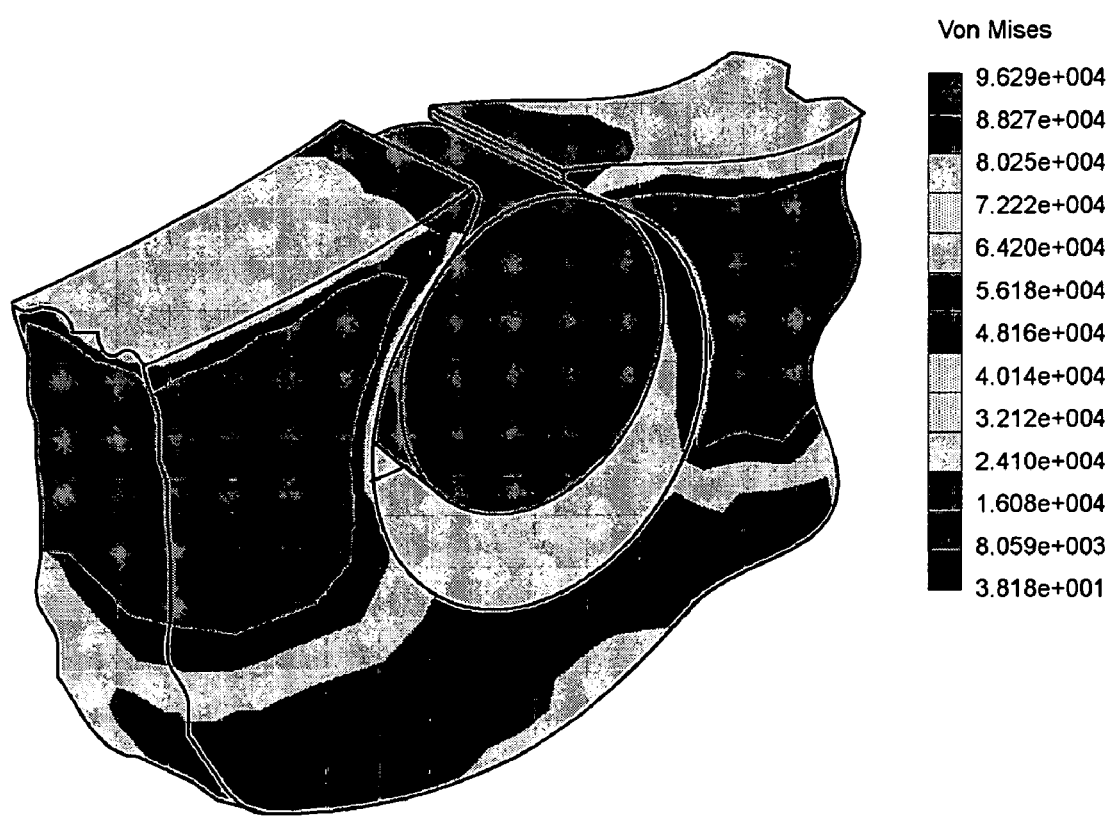
FIG. 8A is a plot of static nodal Von Mises stresses from a three-dimensional finite element analysis for a particular operating speed and temperature distribution showing the details in the region of the bar lamination interface with the bar removed for clarity.

At the tip speed, for example, the dead weight radial loading of the rotor bars 66 bearing on the lamination slot teeth is substantial. As shown in FIG. 8A (deformation exaggerated), the high stresses from these radial loads are apparent in both the bars and on the teeth of the laminations which restrain them. The round cross section bars 66 substantially reduce or minimize both the contact stresses in the copper material and the peak loading on the steel core teeth, providing a good geometry for high-speed applications.

Selection of the rotor bar material can require a balance between mechanical strength properties and electrical resistance. In order to withstand the bearing loading of the high spin stresses and the stress concentration at the area exiting the rotor core 60, higher strength copper alloys can be used. For example, age hardened Zirconium Copper (CDA # C15000) can be used for its combination of high strength (>60 ksi ultimate strength) and high electrical conductivity (90% IACS). In addition to having higher strength than traditional oxygen free copper (OFC), the ZrCu also better maintains high strength through high temperature exposure—important in some power dense applications.

An end ring 30, or "end connector," as understood by those skilled in the art, is the component of a squirrel cage induction machine 15 that completes the electrical circuit between the individual rotor bars 66. Conventionally, the end ring is not connected to the shaft, but rather supported by the rotor bars themselves. For high-speed and high-temperature applications, embodiments of an end ring 30 advantageously can instead be self-supporting, as the rotor bars 66 cannot provide enough stiffness to maintain accurate centering and balance of the end ring 30 under the high loading of rotating imbalance. The high-speed of certain types of motors, for example, demands an advanced end ring 30 that is concentrically piloted on the rotor shaft 21 of the rotor 20 of the motor 15, generator, or other induction machine 15.

Figure 2A:
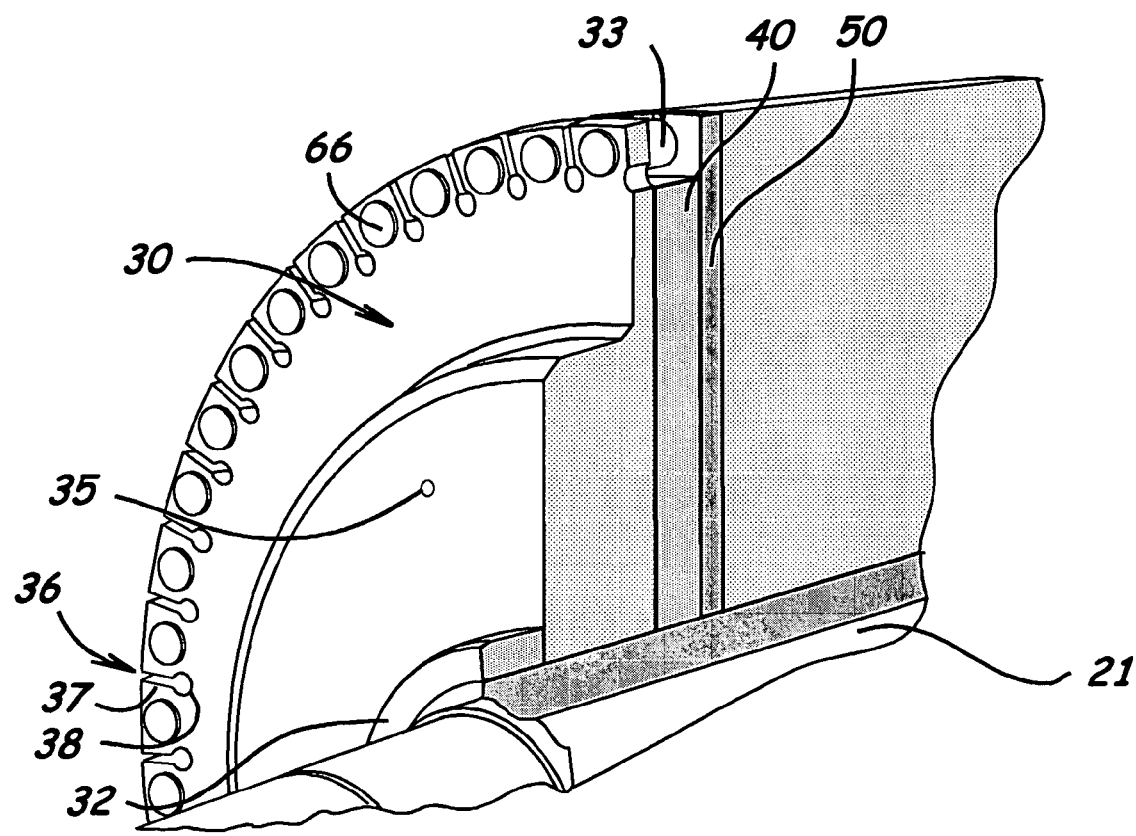
FIG. 2A is a fragmentary sectional view of a motor having an end ring and bar joint according to an embodiment of the present invention.
Figure 2B:
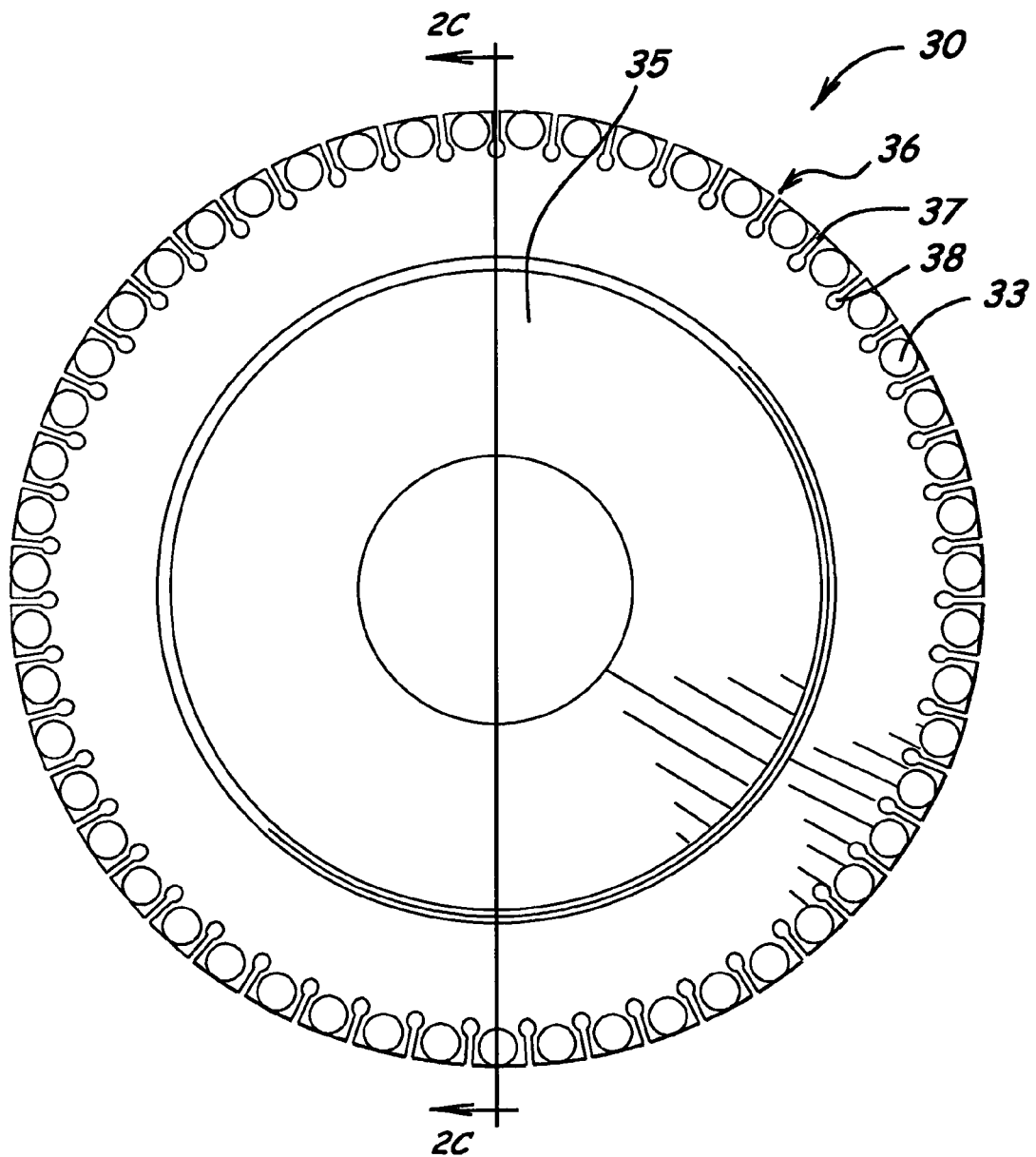
FIG. 2B is a front plan view of an end ring according to an embodiment of the present invention.
Figure 2C:
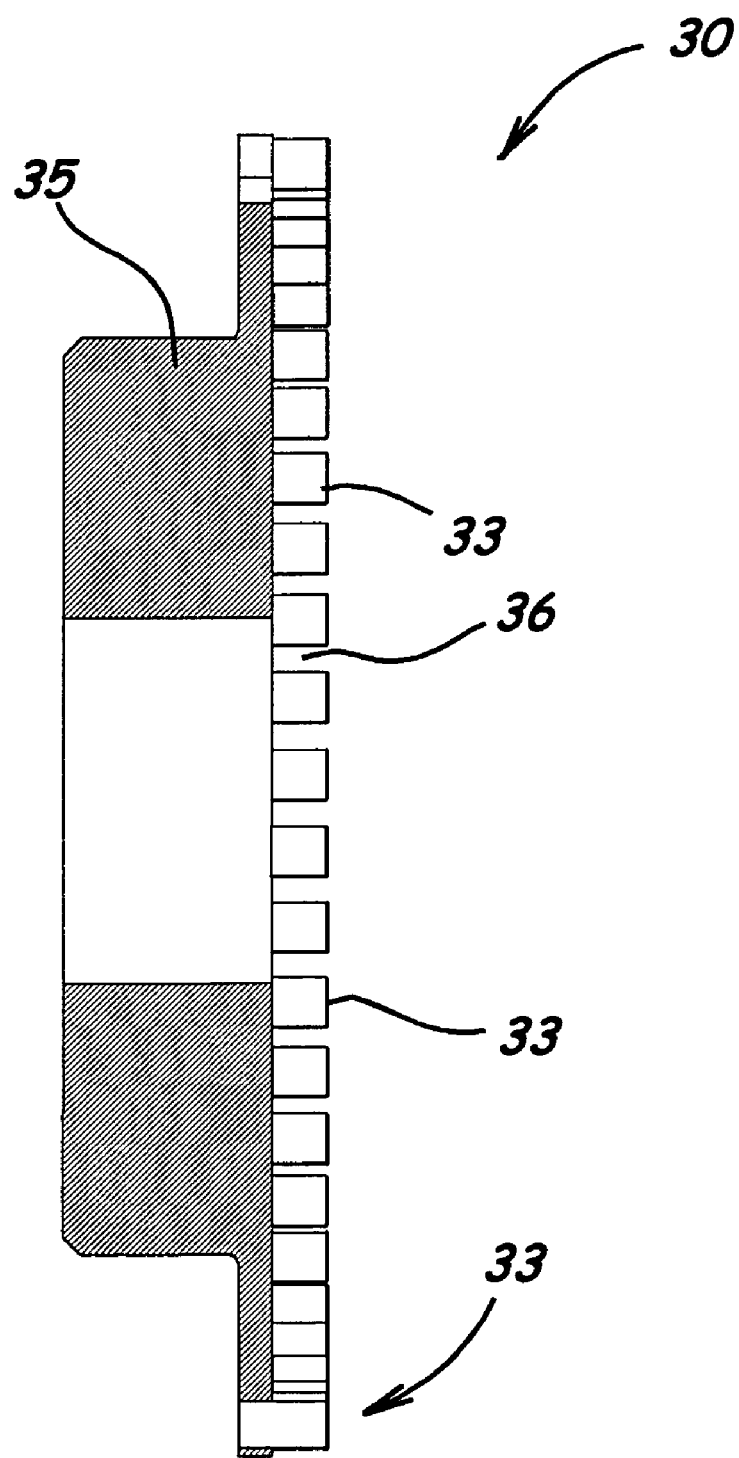
FIG. 2C is a sectional view of an end ring according to an embodiment of the present invention.
Figure 2D:
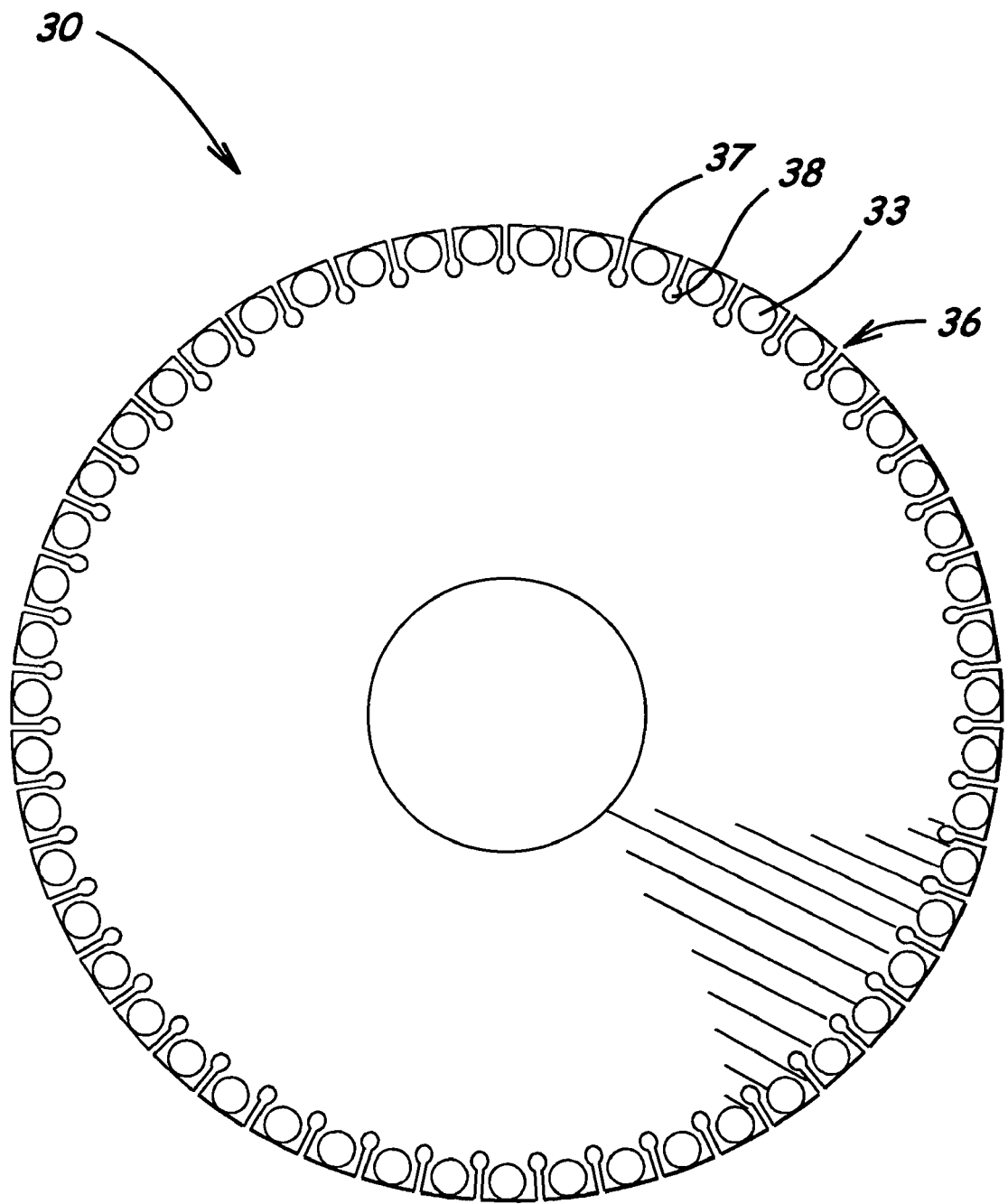
FIG. 2D is a rear plan view of an end ring according to an embodiment of the present invention.
Figure 2E:
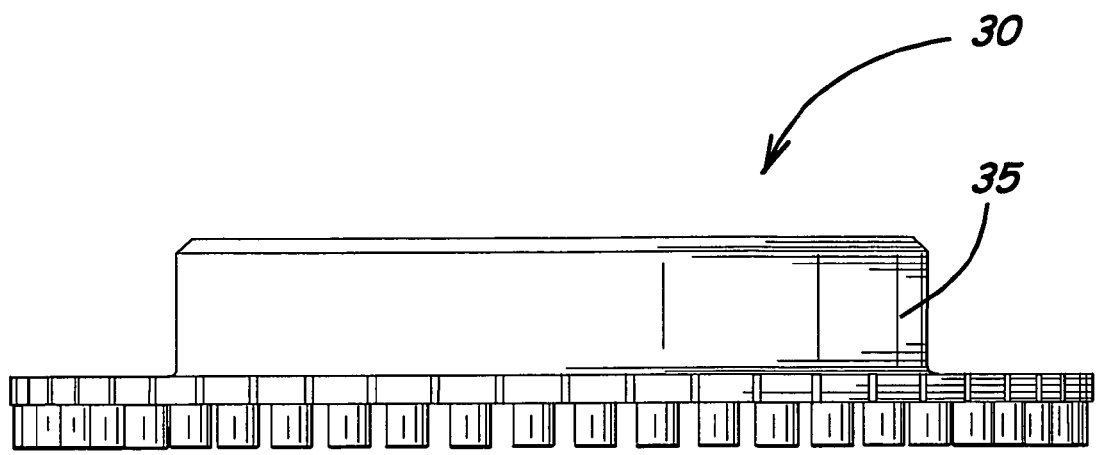
FIG. 2E is a side elevational view of an end ring according to an embodiment of the present invention.
Figure 2F:
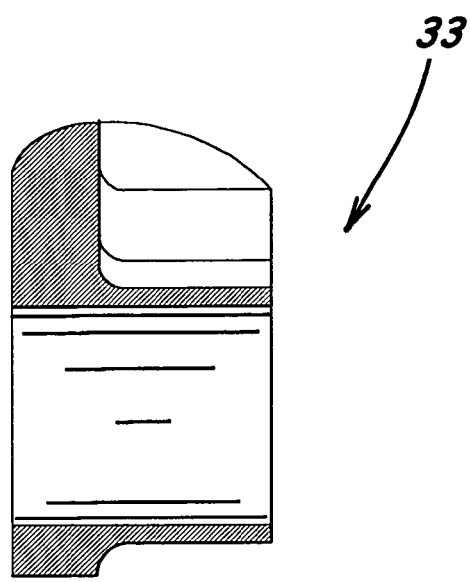
FIG. 2F is an enlarged view of an end ring boss taken along circle B of FIG. 2C according to an embodiment of the present invention.
Figure 2I:
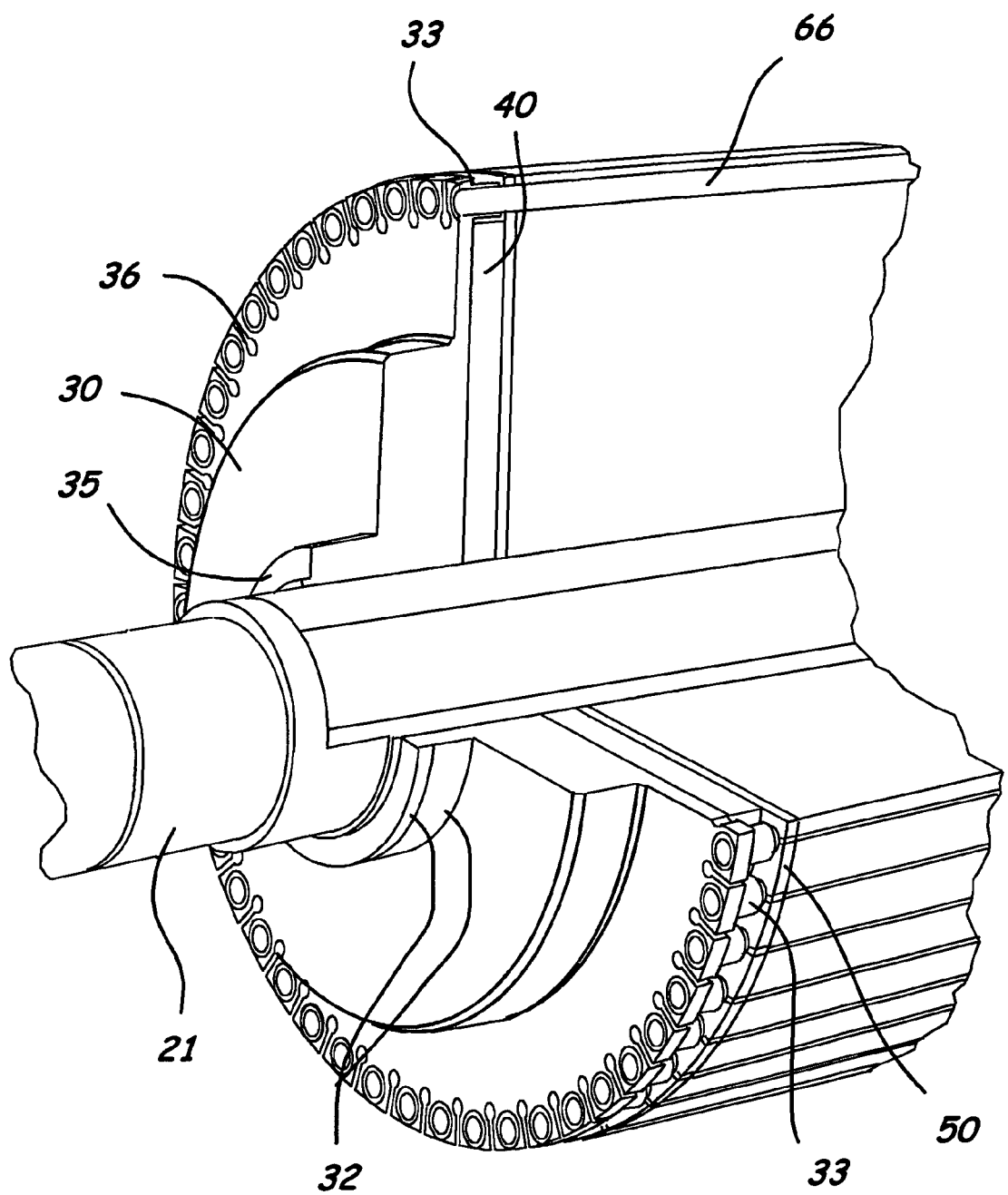
FIG. 2I is a fragmentary perspective view, with portions broken away for clarity, of a rotor having an end ring and bar joint according to an embodiment of the present invention.
Figure 2J:
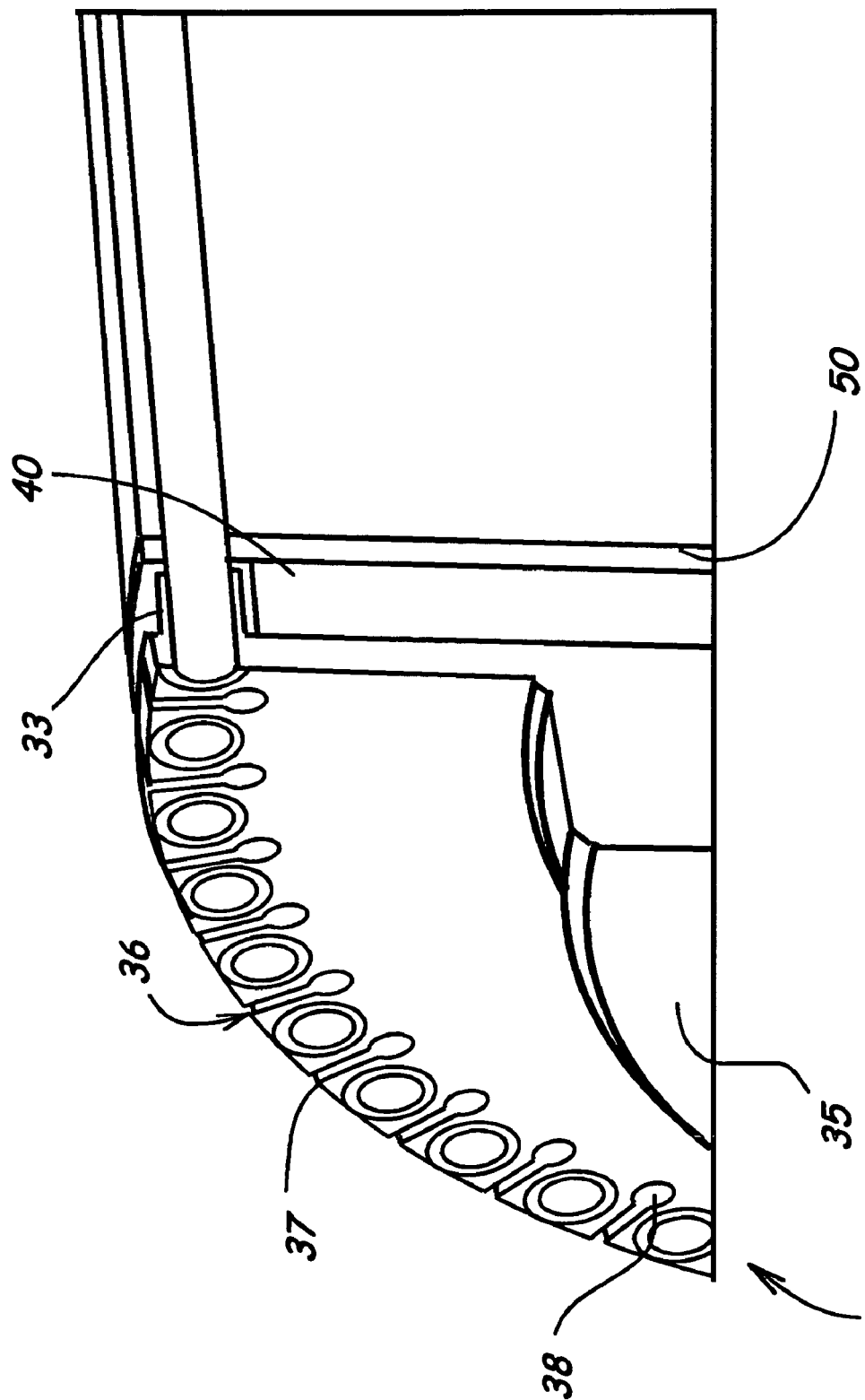
FIG. 2J is a fragmentary sectional view, with portions broken away for clarity, of a rotor having an end ring and bar joint according to an embodiment of the present invention.

According to an embodiment of a rotor 20 of the present invention, each of the plurality of rotor bars 66 can have a substantially cylindrical shape, e.g., formed of Zirconium Copper, each of the plurality of bosses 33 of each of the pair of end rings 30, e.g., formed of Beryllium Copper, also has a substantially cylindrical shape, and each of the plurality of bosses 33 has an end portion of one of the plurality of rotor bars 66 positioned therein, and more preferably extending there through (see FIGS. 2A and 2I). For example, each of the pair of end rings 30 substantially surrounds the rotor shaft 21. The thicker end ring section of the medial portion substantially surrounds the rotor shaft 21 and is substantially solid. The outer peripheral portions of each of the pair of end rings 30 is substantially solid other than the plurality of slots as illustrated. Also, each of the plurality of slots 36 has a first slot portion 37 extending inwardly from outer peripheries of the end ring 30 and a second slot portion 38 extending from the first slot portion 37 and having a substantially annular shape so that the first and second slot portions 37, 38 in combination define a key-hole shape. Clamping nuts 32 also can be included in the end ring and bar joints 25 to assist in retaining the joints 25 on the shaft 21.

As will be understood by those skilled in the art, Intelligent material selection, feature design, and analysis can be used for the successful design of an embodiment of an end ring 30 according to the present invention. Conventional aluminums or OFHC coppers can have insufficient strength to withstand the spin stresses and shaft interference fit required for high speed, stable balance operation. On the other hand, Applicants recognized that Beryllium (Be) Copper (Cu) (CDA # C17510) with a tensile strength>100 ksi and conductivity>60% IACS can be beneficially used for an embodiment of an end ring 30 in order to withstand the stresses and provide sufficiently low electrical resistance.

Embodiments of an end ring 30 incorporate unique design features into the end ring 30 to manage the high spin and thermal growth stresses. A non-uniform cross section design with an axially-thick inner diameter and thin outer diameter allow the end ring 30 to be self supporting with an interference fit to the shaft, while providing axial compliance to allow for thermal bar growth. The plurality of slots 36, e.g., key-hole-shaped, provide a keyhole stress relief feature in the outer diameter of the end ring 30 to isolate the solder joint area from the centrifugal hoop stresses. The spacer plate 40 provides a region for the relative radial growth difference between the end ring 30 and the rotor core 60 to be absorbed in bending of the rotor bars 66 rather than shear. The plurality of cylindrical or annular shaped bosses 33 substantially surround the bar hole of the end ring 30, for example, to blend the deflections and reduce stress concentrations in the area of the bar joint 25.

As will be understood by those skilled in the art, electrical finite element analysis (FEA) was performed using Quick-Field software by Tera Analysis Ltd. to verify that the thicker end ring section 35 along an inner diameter of the end ring 30 is effectively used by carrying significant current levels. For example, due to the two-pole design of some motors, the current path through the end ring 30 is radial, across the diameter. As shown in a plot of the Joule heating losses in FIG. 3A, the current flow does in fact crowd the inner diameter of the end ring 30. The thick end ring section 35, e.g., inner diameter, of the end ring 30 is therefore valuable in reducing the total resistance and 12R losses of the circuit, in addition to providing the mechanical role of supporting the spin loading.

Figure 4A:
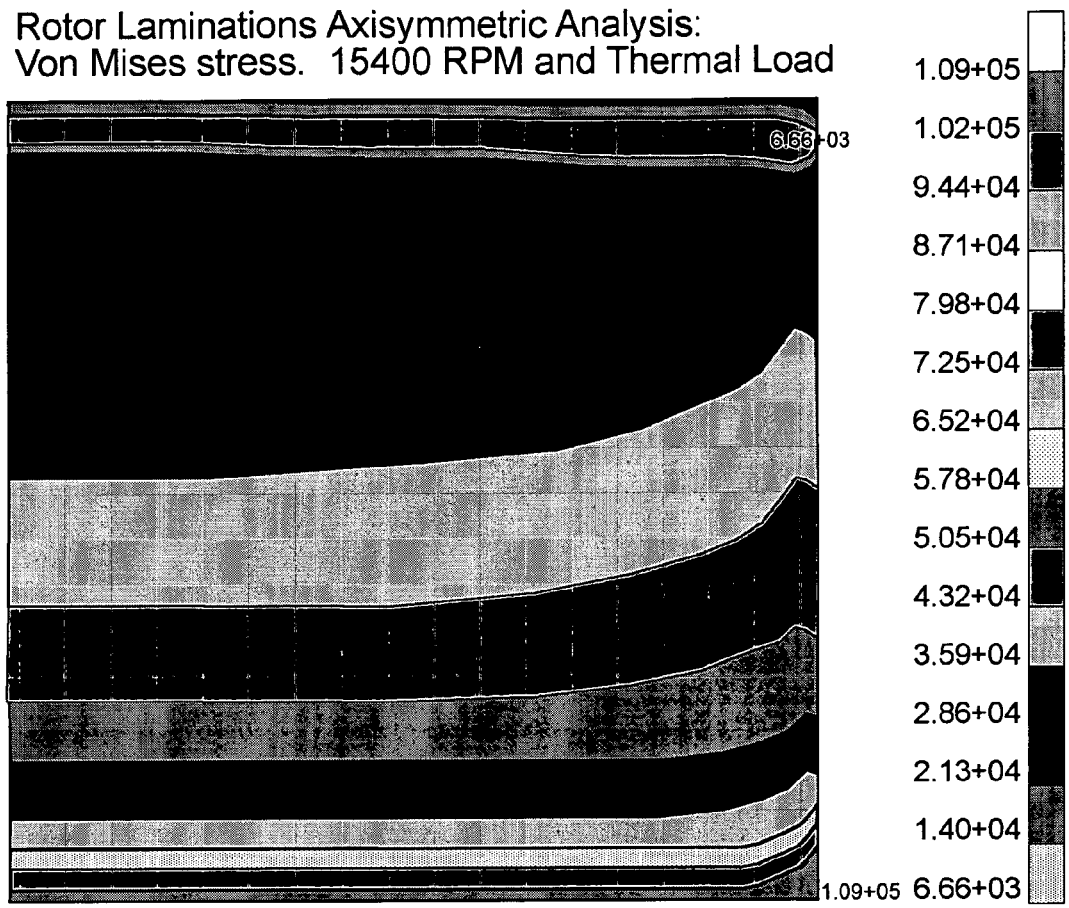
FIG. 4A is a plot of Von Mises stresses from an axisymmetric finite element analysis for a particular operating speed and temperature distribution according to an embodiment of the present invention.
Figure 4B:
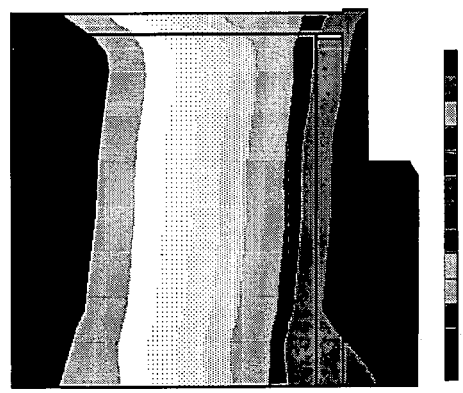
FIG. 4B is a plot of temperature distribution from an axisymmetric finite element analysis for a particular operating speed and power level according to an embodiment of the present invention.

The analysis of the end ring and bar connection area including the soldered joint was performed using a 3D finite element model with CosmosWorks, software by Solidworks Corporation, as understood by those skilled in the art. Analyzing the true geometry in this area is critical as the interplay of rotating forces and thermal growth results in complex deflection modes that cannot be accurately approximated. Thermal analysis was first performed using detailed loss estimates for each rotor component from the EM design code outputs, as also understood by those skilled in the art. Convection coefficients and bulk fluid boundary conditions were computed through a heat balance algorithm and MacroFlow Computational Fluid Dynamics (CFD) software by Innovative Research, Inc. cooling air velocity estimates. FIG. 4B shows the steady state temperature distribution in the rotor for full load operation in a worst-case 50° C. ambient environment.

The thermal distribution mesh was imported into the structural analysis model, and the combined thermal-mechanical loading at 15,400 revolutions per minute ("rpm") overspeed was analyzed for stresses and displacements. The resulting compound deflection mode of the end ring 30 and bars 66 (shown exaggerated in FIG. 9B) generates significant stresses in the joint area.

Figure 8B:
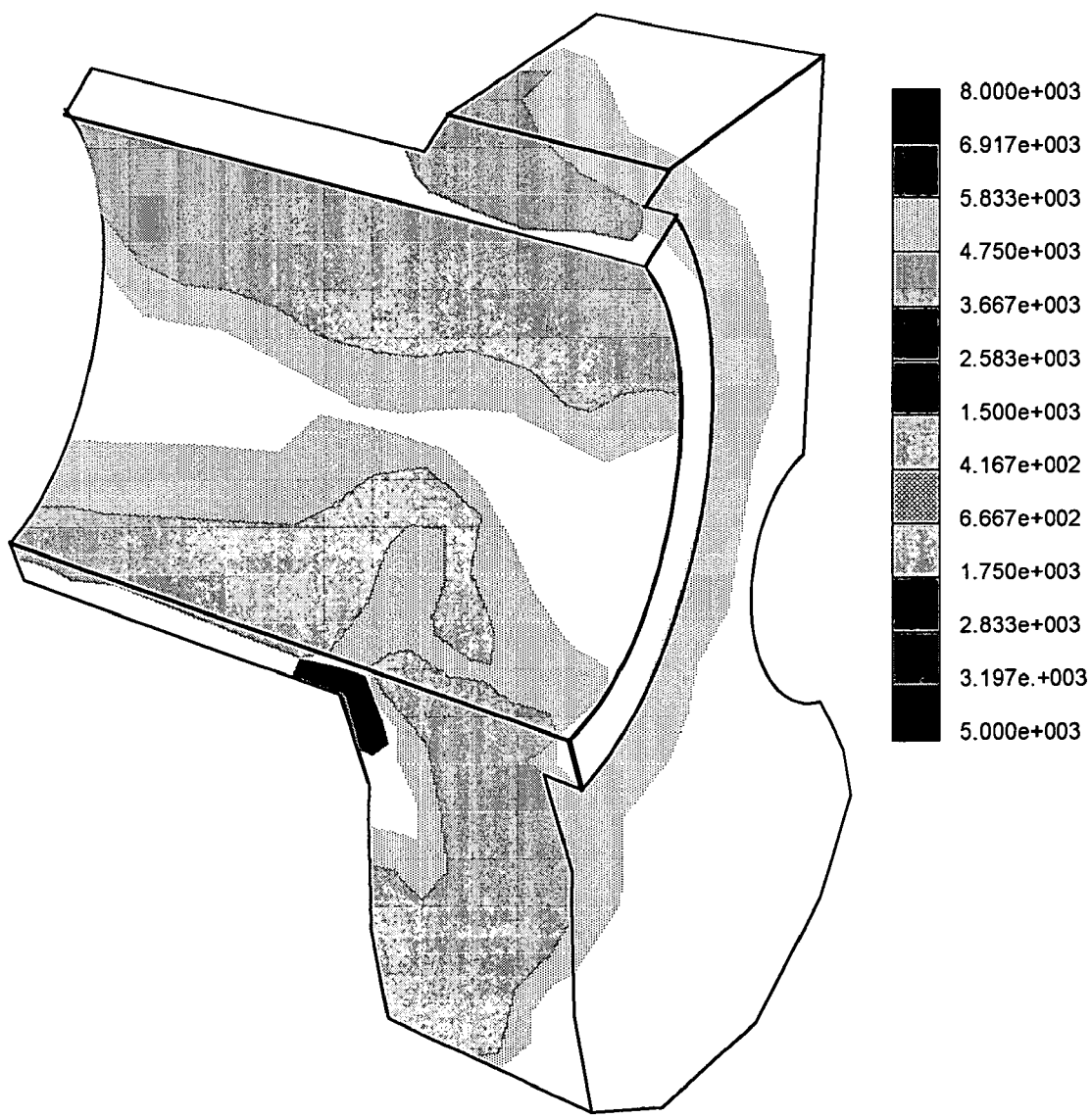
FIG. 8B is a plot of static nodal Von Mises stresses within an end ring boss extension with the bar removed for clarity according to an embodiment of the present invention.
Figure 9A:
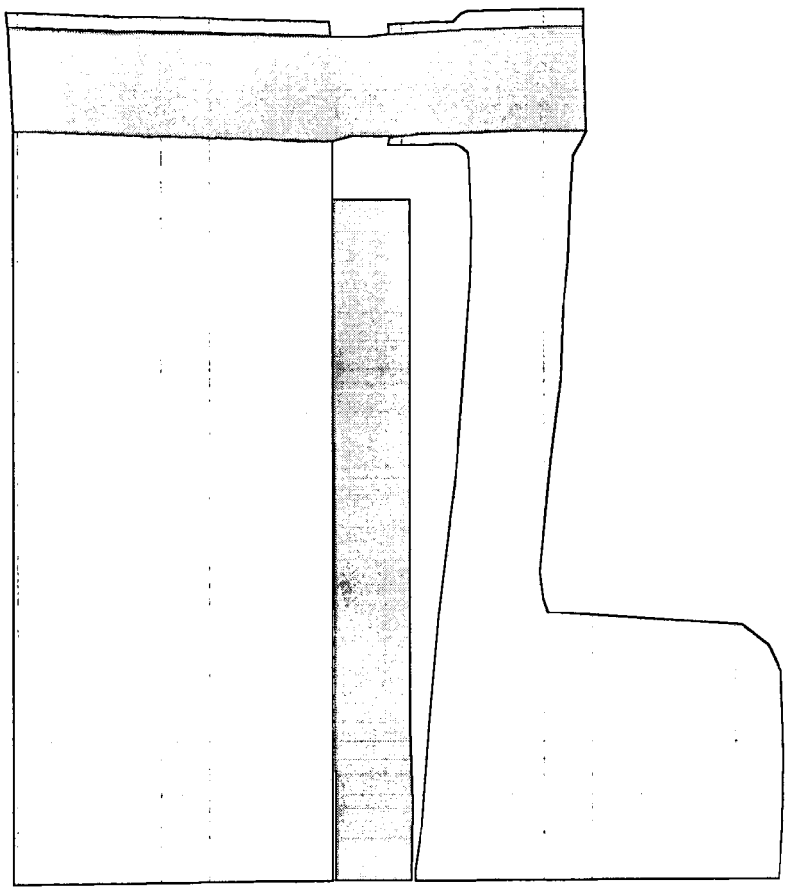
FIGS. 9A-9B are graphical views of nodal deflection under centrifugal and thermal loading.
Figure 9B:
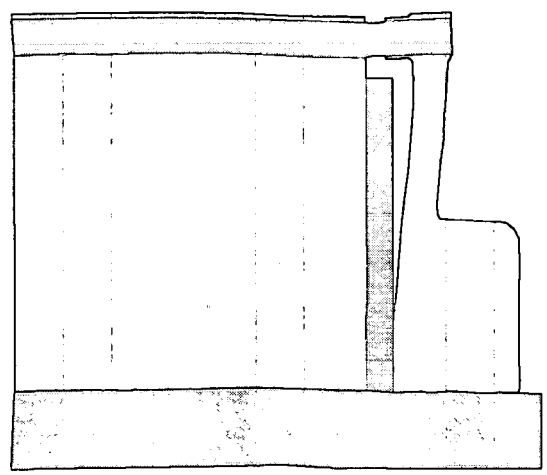
Figure 10:
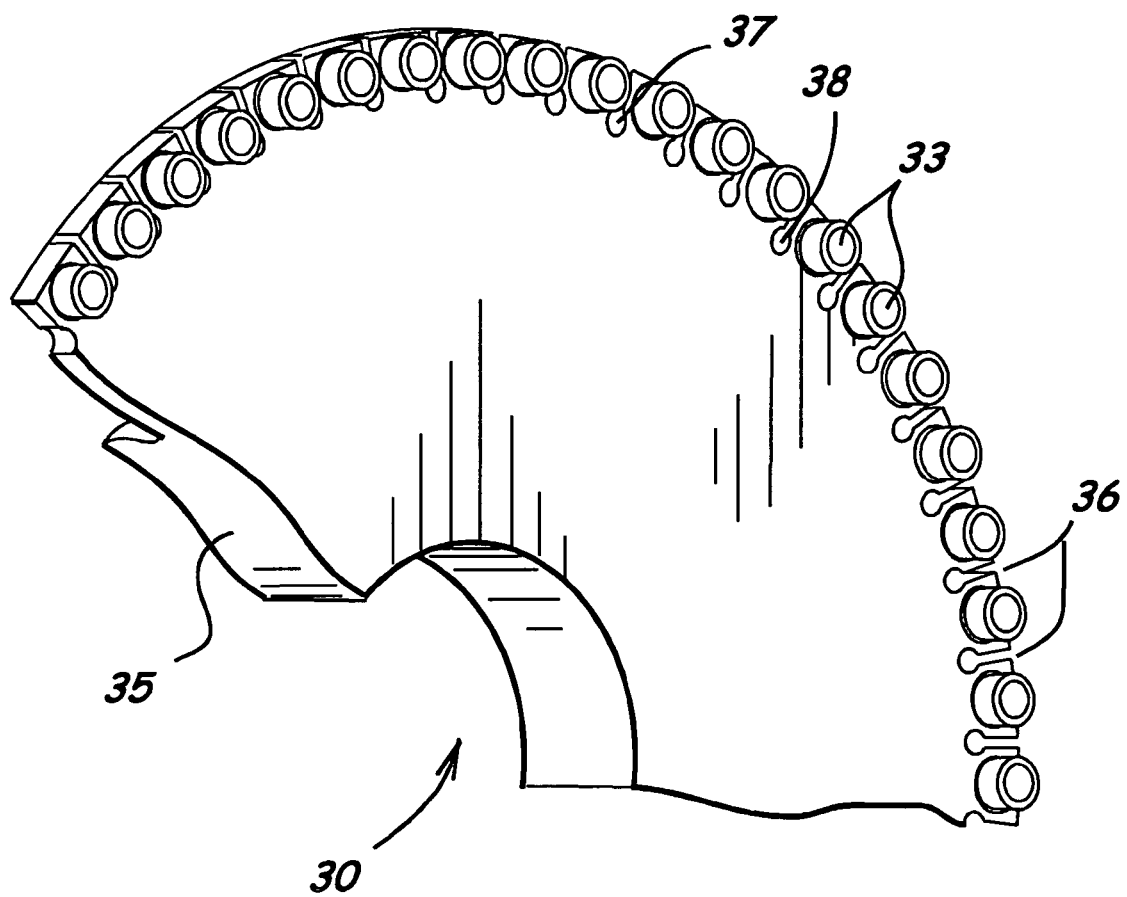
FIG. 10 is a fragmentary rear perspective view of an end ring according to an embodiment of the present invention.

The end ring boss feature graduates the stiffness of the bar's support, thereby reducing the reaction contact and redistributes shear stress concentrations to manageable levels. Whereas peak shear stresses at the sharp corner without the boss feature were approximately 24 ksi, the introduction of a boss 33 dramatically reduced the predictions to less than 9 ksi, as shown in FIG. 8B.

The deflected shape of the rotor bar 66 due to the relative growth differential between the end ring and the core 60 resulted in high stresses on laminations 64 at the end of the core 60. Therefore, a thicker end lamination plate 50 was installed at each end of the lamination core 60 to manage the concentrated stresses. To address this localized stress, for example, AISI 4340 steel with a 195-210 ksi yield strength for the end laminations can be used.

According to embodiments of the present invention, the spacer plate 40 was incorporated into the design in order to reduce the shear stresses on the bar joint by providing a region to redistribute the relative growth between the end ring 30 and core 60. The spacer plate 40, however, serves double duty also as an integral balance ring. The spacer plate 40 is equipped with radial threaded holes 42 for trim balance weights. The weights are inserted radially, and are accessed between the rotor bars. The trim balance capacity of the space plate 40 is governed by the diameter and depth of the holes 42, and the maximum density of the weights. The imbalance correction capacity of the space plate 40 as a balance ring was determined based on the maximum amount of mass center error that is tolerable through the assembly procedure, as understood by those skilled in the art. Coarse balancing of the rotor is accomplished by offset grinding of the shaft bearing journals. This process is accurate within 0.001 inches of mass center offset. The balance ring hole pattern is thus designed to provide the inertial characteristics of more than 0.001 inches of rotor mass center imbalance. Balance can be corrected to within 0.0001 inches of mass center offset for high-speed operation.

Material selection for the spacer plate 40 depends on the electromagnetic conditions in that area. As this spacer plate 40 is adjacent the core 60, in the fringe regions of the machine's flux path, non-ferrous material is preferred to avoid increased hysteresis losses and unnecessary end ring leakage inductance. Additionally, the spacer plate 40 preferably is mechanically self-supporting through its interference fit at the shaft. Consequently, it preferably possesses high strength. For these reasons, for example, Inconel 718, a low permeability nickel alloy, can be used for the spacer plate 40.

Analysis of the rotor bar extension configuration accommodates the relative growth between the end ring 30 and a laminated core 60 at operating speed and temperature. A low temperature joining process for the bar/end ring connections 25 maintains the strength properties of a rotor cage assembly 22 of an induction machine 15.

An embodiment of an end ring 30 for a rotor 60 of an induction machine 15, for example, includes a main body 31 adapted to substantially surround a rotor shaft 21 when mounted thereto and a plurality of slots 36 extending inwardly in a radial direction from outer peripheries of the main body 31. A thicker end ring section 35 extends outwardly from a medial portion of the main body 31, is thicker than the outer peripheries of the main body 31, and also is adapted to substantially surround the rotor shaft 21. A plurality of bosses 33 extends axially and outwardly from outer peripheral portions in a direction opposite to the thicker end ring section 35, and each is adapted to receive an end portion of a rotor bar 66 therein. Each of the plurality of bosses 33 has a substantially cylindrical shape and is adapted to receive one of the plurality of substantially cylindrical shaped rotor bars 66 associated with a rotor 60 therein. The thicker end ring section 35 is substantially solid, and the outer peripheral portions of the main body 31 are substantially solid other than the plurality of slots 36. Each of the plurality of slots 36 has a first slot portion 37 extending inwardly from outer peripheries of the end ring and a second slot portion 38 extending from the first slot portion 37 and having a substantially annular shape so that the first and second slot portions 37, 38 in combination define a key-hole shape.

Embodiments of a rotor shaft 21 of a motor, for example, can be constructed of quenched and tempered 4142 alloy steel, selected for its combination of high strength and toughness. Heavy wall tubing stock is preferred as the shaft 21 is preferably hollow for some applications. The hollow shaft 21 is advantageous for two purposes: it reduces the stresses in the core 60 at the interference fit, and effectively stiffens the rotor 20, thereby raising the bending modes of the rotor 20 and improving the rotor dynamics. The hollow shaft 21 reduces the stresses in the core laminations 64 in the area of the interference fit by adding compliance to the assembly 22. The hollow shaft 21, being more compliant than a solid shaft, shares a portion of the total displacement preload necessary for the interference fit. In this way, for example, the amount of displacement absorbed by the laminations 64 alone is reduced, thereby reducing the preload stresses.

Another advantage of the hollow shaft 21 is improved rotordynamic performance. The broad operating speed range and high upper speed of some machines 15 directly coupled to the flywheel, demand minimal vibratory response. As will be understood by those skilled in the art, appropriately designed inertial properties selected through the core L/D ratio are primary to good rotordynamic response, and the hollow shaft 21 further improves the performance. By removing the center of the shaft 21, significant mass is removed, with very little reduction in shaft stiffness. The net result is an effectively stiffer rotor 60, which assists in driving the first bending mode out of the machine's operating speed range.

Figure 12:
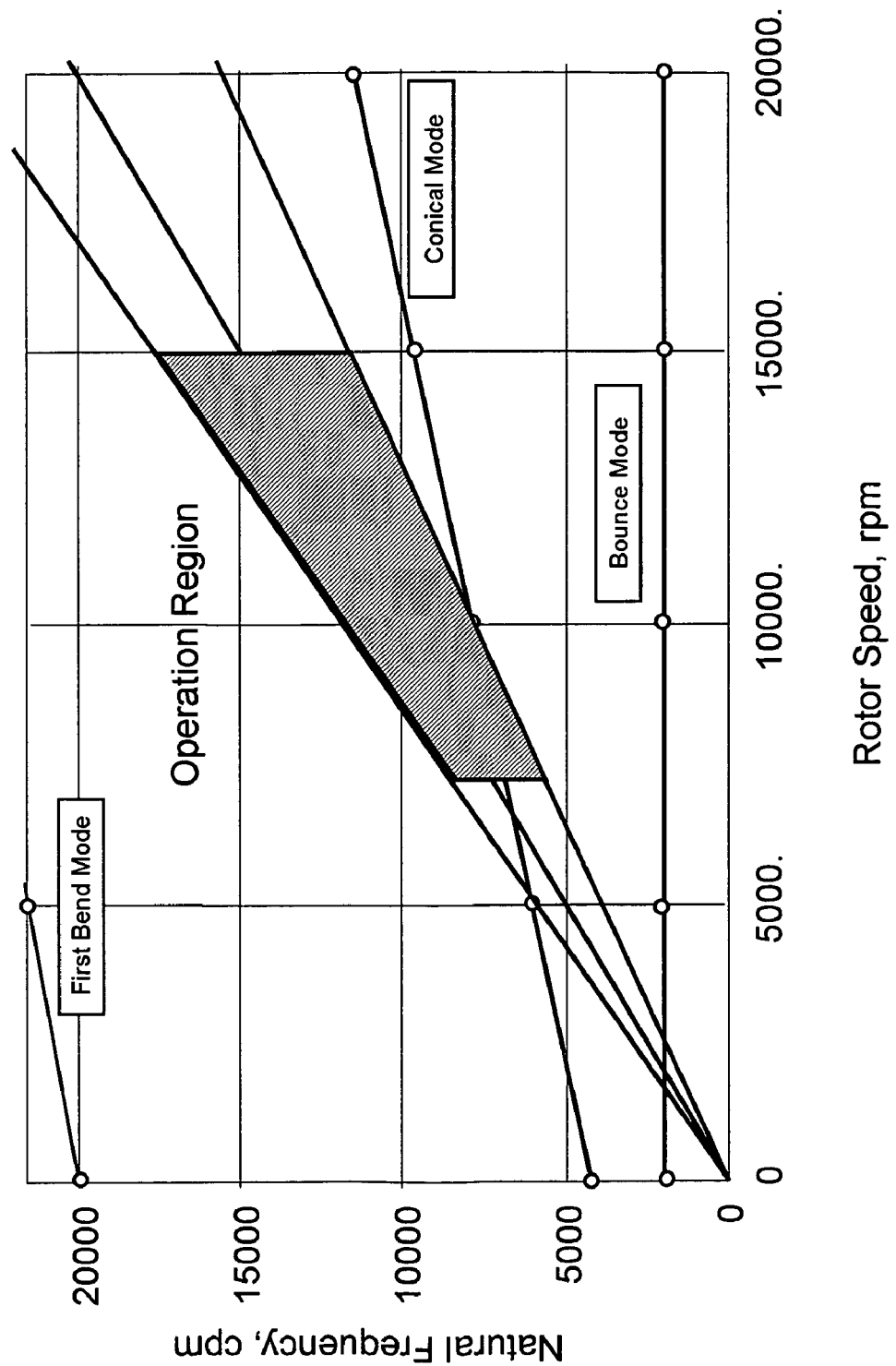
FIG. 12 is a graph of rotordynamic damped natural frequency map having natural frequency versus rotor speed for a rotor shaft according to an embodiment of the present invention.

Due to gyroscopic stiffening, the frequency of the vibratory modes of the rotor 60 changes with speed. The natural frequencies of the system were analyzed and identified with XLRotor, a rotordynamics spreadsheet program, by Rotating Machinery Analysis, Inc. as understood by those skilled in the art. For example, the forward rigid body critical speeds should be traversed on the way to the 7,500-15,000 rpm flywheel operating speed range. As shown in FIG. 12, the conical mode intersects the 20% margin surrounding the synchronous excitation line near 7,500 rpm. The response of the conical mode is minimized to acceptable levels by damping included in the system by squeeze film dampers which house the rotor bearings. The first bending mode intersects the 20% margin on synchronous excitation at approximately 27,000 rpm, well above the maximum operating speed of 15,000 rpm.

The rotor shaft 21 is directly connected to the flywheel shaft through a flexible coupling. The flexible coupling fits to the rotor shaft via a spline. As the diameter of the shaft 21 is reduced or minimized to maximize bearing life (by reducing the dN operating speed of the bearings), very little cross sectional shaft area is available for transmitting torque through the spline, as understood by those skilled in the art. In order to achieve satisfactory stress levels in the spline, additional material can be preserved at the inner diameter of the shaft 21 in the region of the spline by trepanning the shaft tubing to two sizes: a larger inner diameter for a majority of the shaft length underneath the interference fits, and a smaller inner diameter at the splined drive end.

Embodiments of the rotor bars 66 can be joined to the end rings 30 for electrical and mechanical purposes with sound, consistent, reliable joints. The strength requirements for the end ring-to-bar joint 25 can be determined through the coupled thermal-stress analysis, as understood by those skilled in the art. Preserving the material properties of the age hardened copper alloys imposes thermal profile limits on the selected joining process. Conventional brazing techniques will not meet these specific requirements, therefore a customized low temperature, high-strength solder joint can be engineered for some applications.

The targeted strengths of the solder joint, based on the peak tensile and shear stress components identified in the FEA model results with appropriate margin, are 25 ksi and 15 ksi respectively. Brush-Wellman, the supplier of the end ring BeCu material in some embodiments recommends specific alloys for brazing the BeCu alloys which easily meet these strength levels, such as BAg-1, BAg-8, and RBCuZn-D. The process temperatures of these joining fillers, however, exceed the age hardening temperature range (450-550° C.) of both the BeCu and the ZrCu, and in some cases the solution annealing temperature (900° C.) as well. The process of brazing with these fillers would therefore dramatically reduce the mechanical strength of the end ring and bar to unacceptable levels. Re-heat treating of the copper alloys after brazing is not possible as these components are then part of a larger, multiple material assembly.

A number of Au, In, and Zn based filler metals with low process temperatures (less than 450° C.) have been successfully used in other applications, demonstrating high strength. For example, the eutectic 80Au-20Sn solder has a solidus temperature of 280° C. and rated tensile strength of 40 ksi, and is used extensively in the field of microelectronics packaging where high operating temperatures induce large thermal stresses. Other alloys such as Au-12Ge and Au-18In have demonstrated both tensile and shear yield strengths above 20 ksi in similar applications, as understood by those skilled in the art.

Proper surface preparation and oxidation-shielding platings and fluxes to adapt the specialized Au based filler metals to the base metals in this motor joint application may be important. Heating methods, including torch, resistance, and induction are believed to be important to consistently provide the necessary localized heating. Furnace processing of the rotor may not be desirable due to the temperature sensitivity of the numerous coatings, insulative films, and bonding agents in the rotor core.

As illustrated in FIGS. 1-14 and as described above, embodiments of related methods of the present invention can provide a method of assembling a rotor 60 such as for an induction machine 15. The method includes positioning a plurality of substantially cylindrical shaped rotor bars 66 through a plurality of laminations 64 which define a stack and to substantially surround a rotor shaft 21 so that end portions of each of the plurality of rotor bars 66 extends outwardly from opposing ends of the stack, positioning an end lamination plate 50 having a plurality of annular-shaped openings extending along outer peripheries thereof onto each of the end portions of the plurality of rotor bars 66, positioning an end ring 30 including a plurality of bosses 33 extending outwardly toward the end lamination plate 50 along opposing ends of the stack so that each of the plurality of bosses 33 receives an end portion of one of the plurality of rotor bars 66, and positioning a spacer plate 40 between each of the end lamination plate 50 and the end ring 30 positioned along the opposing ends of the stack. Each of the combination of one of the pair of end lamination plates 50, one of the pair of spacer plates 40, and one of the pair of end rings 30 having the plurality of bosses 33 defines an end ring and bar joint 25 of the rotor 60. Each end ring 30 of the end ring and bar joint 25 in this embodiment can further include a main body 31 adapted to substantially surround a rotor shaft 21 when mounted thereto, a plurality of slots 36 extending inwardly in a radial direction from outer peripheries of the main body 31, and a thicker end ring 35 section extending outwardly from a medial portion of the main body 31, being thicker than the outer peripheries of the main body 31, and also being adapted to substantially surround the rotor shaft 21.

Embodiments of related methods also provide a method of operating a rotor 20 of a machine 15. The method includes positioning at least one end ring and bar joint 25 having an end ring 30 on an end of a plurality of laminations 64 defining a stack of a rotor core 60 of a rotor 20 so that the end ring 30 connected to a plurality of rotor bars 66 is substantially supported by a rotor shaft 21 extending through the end ring 30 when the rotor core 60 rotates rather than the plurality of rotor bars 66 and driving the rotor core 60 at a relatively high speed. The at least one end ring and bar joint 25 can further include a spacer 40 positioned between the end ring 30 and an end lamination 50 of the rotor core 60, and the end ring 30 can further have a non-uniform thickness. A thicker section 35 of the end ring 30 can interface with the rotor shaft 21 to bear a substantial amount of the end ring load. The end ring 30 can further have a plurality of end ring bosses 33 positioned spaced-apart along out peripheries of the end ring 30. The method can further include inserting end portions of each of the plurality of rotor bars 66 into a corresponding one of the plurality of end ring bosses 33 and connecting the inserted end portions of the rotor bars 66 to the end ring 30 prior to the step of driving the rotor 20.

The principles, preferred embodiment, and mode of operation of the present invention have been described in the foregoing specification. This invention is not to be construed as limited to the particular forms or embodiments disclosed, since these are regarded as illustrative rather than restrictive. Moreover, variations and changes may be made by those skilled in the art without departing from the spirit of the invention.

That claimed is:

1. An apparatus comprising
 a stator having a stator frame, a stator core positioned in the stator frame, and a stator winding positioned in the stator frame; and
 a rotor associated with the stator and including a rotor shaft, a rotor cage assembly substantially surrounding at least portions of the rotor shaft, the rotor cage assembly including a rotor core having a plurality of laminations defining a stack, a plurality of rotor bars associated with the plurality of laminations, a pair of an end lamination plates positioned along opposing ends of the stack and associated with the plurality of rotor bars, a pair of end rings each positioned adjacent one of the pair of end lamination plates and connected to each of the plurality of rotor bars, and a pair of spacer plates each positioned between one of the pair of end lamination plates and one of the pair of end rings, each of the pair of end rings having a plurality of slots extending inwardly in a radial direction from outer peripheries of the end ring toward a medial portion of the end ring and a plurality of bosses extending axially and outwardly from outer peripheral portions toward one of the pair of end lamination plates, the medial portion of each of the pair of end rings including a thicker end ring section extending outwardly and axially away from the spacer plate and being thicker than the outer peripheral portions.

2. An apparatus as defined in claim 1, wherein each of the plurality of rotor bars has a substantially cylindrical shape, wherein each of the plurality of bosses of each of the pair of end rings also has a substantially cylindrical shape, and wherein each of the plurality of bosses has an end portion of one of the plurality of rotor bars positioned therein.

3. An apparatus as defined in claim 1, wherein each of the pair of end rings substantially surrounds the rotor shaft, wherein the thicker end ring section of the medial portion substantially surrounds the rotor shaft and is substantially solid, and wherein the outer peripheral portions of each of the pair of end rings is substantially solid other than the plurality of slots.

4. An apparatus as defined in claim 1, wherein each of the plurality of slots has a first slot portion extending inwardly from outer peripheries of the end ring and a second slot portion extending from the first slot portion and having a substantially annular shape so that the first and second slot portions in combination define a key-hole shape.

5. An apparatus as defined in claim 2, wherein each of the pair of end lamination plates has a plurality of annular-shaped openings extending along outer peripheries of the end lamination plate, each of the plurality of annular-shaped openings having one of the plurality of stator bars extending there through to coaxially align with one of the plurality of bosses associated with one of the pair of end rings.

6. A rotor for an induction machine, the rotor comprising:
a rotor shaft; and
a rotor cage assembly substantially surrounding at least portions of the rotor shaft, the rotor cage assembly including a rotor core having a plurality of laminations defining a stack, a plurality of rotor bars associated with the plurality of laminations, a pair of an end lamination plates positioned along opposing ends of the stack and associated with the plurality of rotor bars, a pair of end rings each positioned adjacent one of the pair of end lamination plates and connected to each of the plurality of rotor bars, and a pair of spacer plates each positioned between one of the pair of end lamination plates and one of the pair of end rings, each of the pair of end rings having a plurality of slots extending inwardly in a radial direction from outer peripheries of the end ring toward a medial portion of the end ring and a plurality of bosses extending axially and outwardly from outer peripheral portions toward one of the pair of end lamination plates, the medial portion of each of the pair of end rings including a thicker end ring section extending outwardly and axially away from the spacer plate and being thicker than the outer peripheral portions, the combination of one of the pair of end lamination plates, one of the pair of spacer plates, and one of the pair of end rings having the plurality of bosses defining an end ring and bar joint of the rotor.

7. A rotor as defined in claim 6, wherein each of the plurality of rotor bars has a substantially cylindrical shape, wherein each of the plurality of bosses of each of the pair of end rings also has a substantially cylindrical shape, and wherein each of the plurality of bosses has an end portion of one of the plurality of rotor bars positioned therein.

8. A rotor as defined in claim 7, wherein each of the pair of end rings substantially surrounds the rotor shaft, wherein the thicker end ring section of the medial portion substantially surrounds the rotor shaft and is substantially solid, and wherein the outer peripheral portions of each of the pair of end rings is substantially solid other than the plurality of slots.

9. A rotor as defined in claim 8, wherein each of the plurality of slots has a first slot portion extending inwardly from outer peripheries of the end ring and a second slot portion extending from the first slot portion and having a substantially annular shape so that the first and second slot portions in combination define a key-hole shape.

10. A rotor as defined in claim 9, wherein each of the pair of end lamination plates has a plurality of annular-shaped openings extending along outer peripheries of the end lamination plate, each of the plurality of annular-shaped openings having one of the plurality of stator bars extending there through to coaxially align with one of the plurality of bosses associated with one of the pair of end rings.

11. An end ring for a rotor of an induction machine, the end ring comprising:
a main body adapted to substantially surround a rotor shaft when mounted thereto;
a plurality of slots extending inwardly in a radial direction from outer peripheries of the main body;
a thicker end ring section extending outwardly from a medial portion of the main body, being thicker than the outer peripheries of the main body, and also being adapted to substantially surround the rotor shaft; and
a plurality of bosses extending axially and outwardly from outer peripheral portions in a direction opposite to the thicker end ring section and each adapted to receive an end portion of a rotor bar therein.

12. An end ring as defined in claim 11, wherein each of the plurality of bosses has a substantially cylindrical shape and is adapted to receive one of the plurality of substantially cylindrical shaped rotor bars associated with a rotor therein.

13. An end ring as defined in claim 11, wherein the thicker end ring section is substantially solid, and wherein the outer peripheral portions of the main body is substantially solid other than the plurality of slots.

14. An end ring as defined in claim 11, wherein each of the plurality of slots has a first slot portion extending inwardly from outer peripheries of the end ring and a second slot portion extending from the first slot portion and having a substantially annular shape so that the first and second slot portions in combination define a key-hole shape.

15. A method of assembling a rotor, the method comprising:
positioning a plurality of substantially cylindrical shaped rotor bars through a plurality of laminations which define a stack and to substantially surround a rotor shaft so that end portions of each of the plurality of rotor bars extends outwardly from opposing ends of the stack;
positioning an end lamination plate having a plurality of annular-shaped openings extending along outer peripheries thereof onto each of the end portions of the plurality of rotor bars;
positioning an end ring including a plurality of bosses extending outwardly toward the end lamination plate along opposing ends of the stack so that each of the plurality of bosses receives an end portion of one of the plurality of rotor bars; and
positioning a spacer plate between each of the end lamination plate and the end ring positioned along the opposing ends of the stack.

16. A method as defined in claim 15, wherein each end ring further includes a main body adapted to substantially surround a rotor shaft when mounted thereto, a plurality of slots extending inwardly in a radial direction from outer peripheries of the main body, and a thicker end ring section extending outwardly from a medial portion of the main body, being thicker than the outer peripheries of the main body, and also being adapted to substantially surround the rotor shaft.

* * * * *